(12) United States Patent
Nunes

(10) Patent No.: US 11,699,178 B1
(45) Date of Patent: Jul. 11, 2023

(54) PERSONALIZED GARMENT AND CLOTHING DESIGN PROCESS

(71) Applicant: Jordan Lauree Nunes, Manteca, CA (US)

(72) Inventor: Jordan Lauree Nunes, Manteca, CA (US)

( * ) Notice: Subject to any disclaimer, the term of this patent is extended or adjusted under 35 U.S.C. 154(b) by 0 days.

(21) Appl. No.: 17/750,105

(22) Filed: May 20, 2022

(51) Int. Cl.
| | |
|---|---|
| *G06Q 30/00* | (2023.01) |
| *G06Q 30/0601* | (2023.01) |
| *G06F 3/0482* | (2013.01) |
| *G06F 3/04845* | (2022.01) |
| *G06Q 10/0875* | (2023.01) |
| *G06Q 30/04* | (2012.01) |

(52) U.S. Cl.
CPC ....... *G06Q 30/0621* (2013.01); *G06F 3/0482* (2013.01); *G06F 3/04845* (2013.01); *G06Q 30/0643* (2013.01); *G06Q 10/0875* (2013.01); *G06Q 30/04* (2013.01); *G06Q 30/0609* (2013.01)

(58) Field of Classification Search
USPC ...................................................... 705/26.5
See application file for complete search history.

(56) References Cited

U.S. PATENT DOCUMENTS

| | | | | |
|---|---|---|---|---|
| 8,165,711 B2 * | 4/2012 | Brooking | ................ | G06F 30/00 |
| | | | | 700/132 |
| 9,477,979 B2 * | 10/2016 | Harvill | ................... | G06Q 30/06 |
| 10,127,480 B1 * | 11/2018 | Lehrer | ............... | G06Q 30/0621 |
| 11,064,750 B2 * | 7/2021 | Bajaj | .................. | G05B 19/4097 |
| 11,244,223 B2 * | 2/2022 | Sareen | ................. | G06Q 10/101 |
| 2009/0063309 A1 * | 3/2009 | Stephens | ............... | G06Q 10/06 |
| | | | | 705/29 |
| 2009/0222127 A1 * | 9/2009 | Lind | .................. | G06Q 30/0601 |
| | | | | 705/26.1 |

(Continued)

OTHER PUBLICATIONS

Lamothe, J., Hadj-Hamou, K., Aldanondo, M., An optimization model for selecting a product family and designing its supply chain), 2006, European Journal of Operational Research, pp. 1030-1047. (Year: 2006).*

*Primary Examiner* — Jeffrey A. Smith
*Assistant Examiner* — Brittany E Bargeon
(74) *Attorney, Agent, or Firm* — Plager Schack LLP; Mark H. Plager; Stephen Hallberg

(57) ABSTRACT

A personalized garment and clothing design system and a personalized garment and clothing design process are disclosed. The personalized garment and clothing design system provides a user-accessible, interactive website that is configured to allow a user to design personalized garments and clothes. The personalized garment and clothing design system hosts a website that is interactive and provides several personalized garment and clothing design web user interface (UI) tools through which the user can provide personalized body type and sizing information. The user can utilize the UI tools to customize and personalize styles, fabrics, trims, sizing, colors, patterns, clothing and garment features, etc. The user can also interact with a customized digital mannequin to view personalized garment and clothing designs in progress. When finished, the garment or clothing design is physically produced and sent to the user to wear or start their own line and sell their custom designed garments.

6 Claims, 20 Drawing Sheets

(56) References Cited

U.S. PATENT DOCUMENTS

| | | | | |
|---|---|---|---|---|
| 2010/0161383 | A1* | 6/2010 | Butler | G06Q 10/103 |
| | | | | 705/28 |
| 2014/0360030 | A1* | 12/2014 | Grove | A41H 3/04 |
| | | | | 33/17 R |
| 2017/0273383 | A1* | 9/2017 | deGuzman | G05B 19/40931 |
| 2019/0272679 | A1* | 9/2019 | Brodsky | G06F 30/20 |
| 2020/0063308 | A1* | 2/2020 | Schultz | A41H 43/00 |
| 2020/0375293 | A1* | 12/2020 | Koh | G06Q 30/0641 |

\* cited by examiner

2100

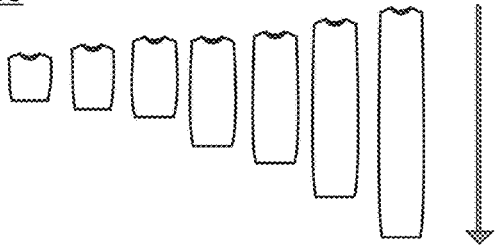

Length tool
Click and draw the arrow to adjust the length of the selected pattern silhouette.

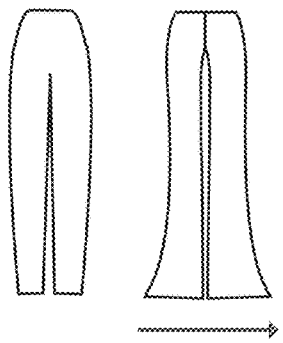

Width tool
Click and draw the arrow to adjust the width of the selected pattern silhouette.

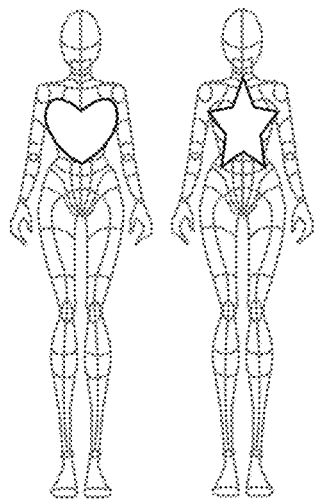

Create Shape Tool-
Create your own shape pattern piece. Select from the provided shapes or you can use the freestyle option to create your own shape. Later, you can add straps, closures, sleeves, or any other garment details.

FIG. 23

PERSONALIZED GARMENT AND CLOTHING DESIGN PROCESS

BACKGROUND

Embodiments of the invention described in this specification relate generally to fashion and design, and more particularly, to a personalized garment and clothing design system and a personalized garment and clothing design process.

The current (or existing) clothing design paradigm is largely based on designers and fashion labels creating clothing items which are most often sold to consumers through retail businesses. While most people purchase their clothing items from retail businesses and many of these consumers are satisfied with these clothing items designed by designers and labels and purchases via retail, there are often many other consumers who have particular needs with respect to clothing items, accessories, and the like. For instance, many consumers have trouble finding specific clothing items for their needs or as they wish. This is a problem for consumers who have conceptual ideas of specific clothing items they want or need but are unable to find the specific clothing items anywhere.

Another problem with the existing clothing design paradigm is that many aspiring clothing designers lack experience and do not know where to begin with starting a fashion line. There are few options aside from making sketches of designs or one-off clothing. Even then, it is often difficult for aspiring designers to obtain certain materials or apparel construction items, since existing outlets typically carry only a limited range of items in stores. For instance, an aspiring designer may be able to produce a one-off clothing item design, but to produce a line of clothing is more challenging with limited resources in procuring materials needed for the design, and handling aspects related to scale.

Therefore, what is needed is a way for people to design their own clothing and garment items, procure the materials for creating their designed clothing and garment items, and create the actual clothing and garment items.

BRIEF DESCRIPTION

Some embodiments of the invention include a novel personalized garment and clothing design system and a personalized garment and clothing design process. In some embodiments, the personalized garment and clothing design system is implemented as a cloud-based software-as-a-service (SaaS) that provides a user-accessible, interactive website that is configured to allow a user to design personalized garments and clothes. The cloud-based SaaS hosts a personalized garment and clothing design service to which computing devices of users connect to access the interactive website in which users can design their own garments and clothes. The website is interactive and provides several personalized garment and clothing design web user interface (UI) tools through which the user can provide personalized body type and sizing information. The user can utilize the UI tools to customize and personalize styles, fabrics, trims, sizing, colors, patterns, clothing and garment features (such as pockets, zippers, buttons, etc.), and any of several other garment and clothing design options. The user can also interact with a customized digital mannequin to view personalized garment and clothing designs in progress. When finished, the garment or clothing design is physically produced and sent to the user to wear or start their own line and sell their custom designed garments.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 21 conceptually illustrates a length tool in some embodiments.

FIG. 22 conceptually illustrates a width tool in some embodiments.

FIG. 23 conceptually illustrates a create shape tool in some embodiments.

DETAILED DESCRIPTION

Figure 1:
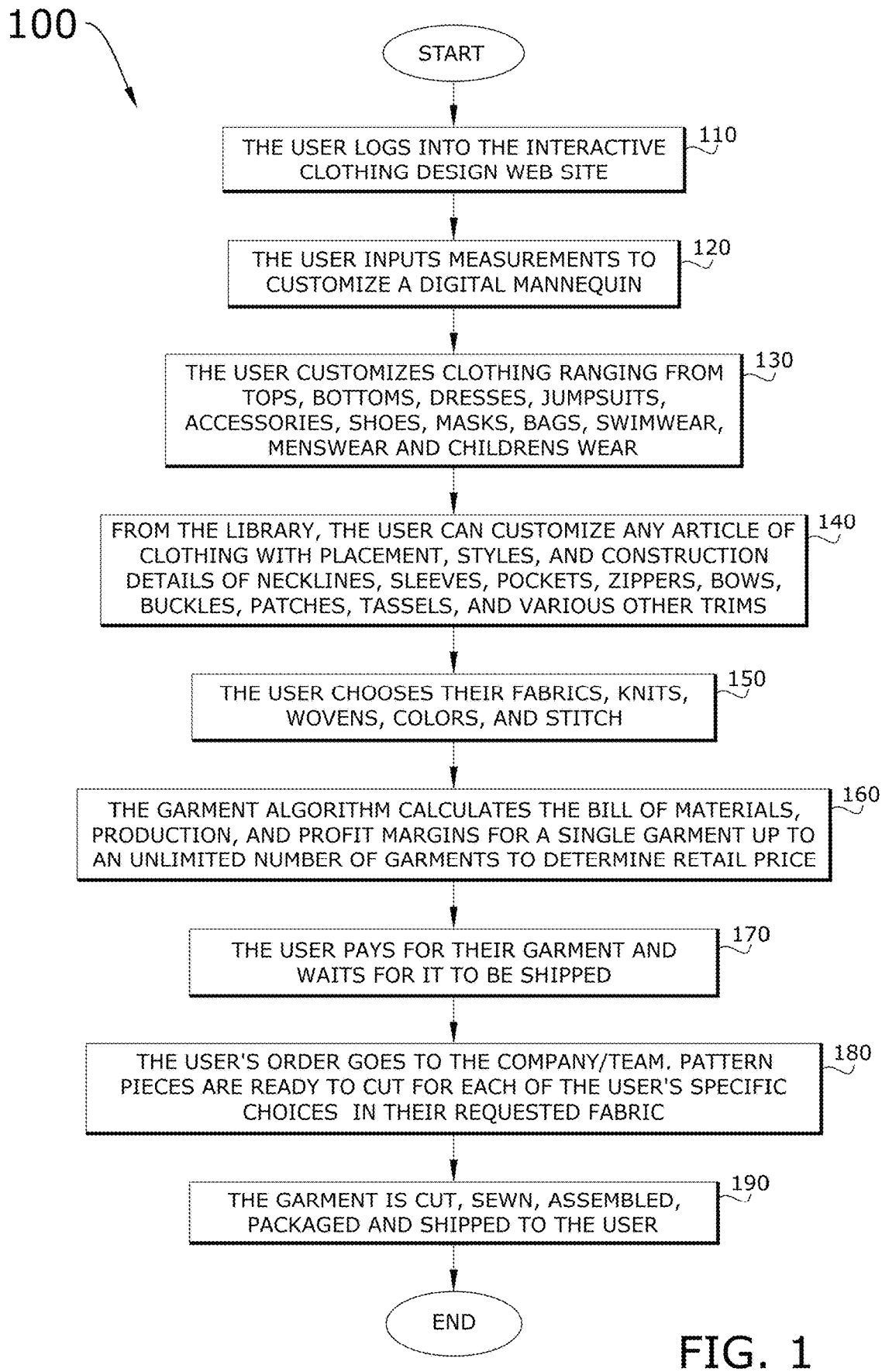
FIG. 1 conceptually illustrates a personalized garment and clothing design process in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments provide a personalized garment and clothing design system and a personalized garment and clothing design process. In some embodiments, the personalized garment and clothing design system is implemented as a cloud-based software-as-a-service (SaaS) that provides a user-accessible, interactive website that is configured to allow a user to design personalized garments and clothes. The cloud-based SaaS hosts a personalized garment and clothing design service to which computing devices of users connect to access the interactive website in which users can design their own garments and clothes. The website is interactive and provides several personalized garment and clothing design web user interface (UI) tools through which the user can provide personalized body type and sizing information. The user can utilize the UI tools to customize and personalize styles, fabrics, trims, sizing, colors, patterns, clothing and garment features (such as pockets, zippers, buttons, etc.), and any of several other garment and clothing design options. The user can also interact with a customized digital mannequin to view personalized garment and clothing designs in progress. When finished, the garment or clothing design is physically produced and sent to the user to wear or start their own line and sell their custom designed garments.

In some embodiments, the personalized garment and clothing design process starts when a user connects, via a computing device (such as a computer, a laptop, a mobile smartphone, or a tablet computing device) over a public network (such as the Internet), to the personalized garment and clothing design service. In some embodiments, the personalized garment and clothing design process includes a plurality of steps after the user is connected to the personalized garment and clothing design service comprising (i) logging in, by the user, to an interactive clothing design website that is provided as a platform starting point of the personalized garment and clothing design service, (ii) inputting, by the user, measurements to customize a digital mannequin, (iii) customizing, by the user, one or more clothing and garment types (such as tops, bottoms, dresses, jumpsuits, accessories, shoes, masks, bags, swimwear, menswear, children's wear, or other types of clothing and garments), (iv) accessing a library of clothing and garment items, by the user, to customize any article of clothing or garment with placement, styles, and construction details of any such article of clothing or garment (including, without limitation, necklines, sleeves, pockets, zippers, bows, buckles, patches, tassels, and various other trims), (v) selecting, by the user, fabrics, knits, woven, colors, and stitching, among other optional choices by the user, (vi) interacting with a set of clothing and garment customization and display viewing user interface (UI) tools (including at least a widget UI tool, a rotate UI tool, and a cut-out UI tool, which are also collectively referred to as "widget UI tools"), (vii) automatically calculating, by a garment calculation algorithm, a bill of materials, production, profit, taxes, shipping, and additional fees as per user selections, (viii) presenting the calculated total bill, based on quantity of clothing items to create, to the user for payment of the total bill, (ix) transmitting the user order for creation of clothing item(s)/garment(s), upon confirmation of payment of the total bill by the user, to a production unit to create the user's clothing item(s)/garment(s), and after the clothing item(s)/garment(s) are created and assembled, (x) shipping the clothing item(s)/garment(s) to the user.

From the perspective of the personalized garment and clothing design service, the personalized garment and clothing design process comprises (i) receiving user credentials associated with an incoming connection made by a computing device, (ii) searching a registered user database to find and validate the user credentials for a particular user, (iii) allowing the particular user to engage with a plurality of personalized garment and clothing design user interfaces (UI) and UI tools associated with the personalized garment and clothing design service, (iv) receiving a selection of a prototypical digital mannequin and a set of body measurements associated with the particular user to customize a digital mannequin for interactive use by the particular user, (v) receiving selections of clothing and garment items by the particular user interacting with a plurality of clothing and garment libraries (including, without limitation, tops, necklines, sleeves, bottoms, accessories, shoes, masks, bags, swimwear, menswear, children's wear, or other types of clothing and garments), (iv) placing clothing and garment item selections onto the customized digital mannequin for interaction and viewing by the particular user, (v) receiving one or more adjustments to the clothing and garment items placed onto the customized digital mannequin by the particular user, (vi) receiving selections of apparel construction items in connection with any one or more of the clothing and garment items placed onto the customized digital mannequin (including, without limitation, pockets, zippers, bows, buckles, patches, tassels, and various other trims), (vii) receiving selections of fabrics, knits, woven, colors, stitching, and hemming by the particular user to apply to the clothing and garment items placed onto the customized digital mannequin among other optional choices by the particular user, (viii) providing the particular user with access to a set of clothing and garment customization and display viewing UI tools (including at least a widget UI tool, a rotate UI tool, and a cut-out UI tool), (ix) receiving a quantity value from the particular user for creation of a particular production item order that incorporates all of the clothing and garment item selections, adjustments, and tool modified settings, (x) automatically calculating, by a garment calculation algorithm, a bill of materials for the particular production item order multiplied by the quantity value with additional calculation to add cost of production, a profit margin, taxes, shipping, and additional fees as per any other selections or requests from the particular user, (xi) presenting the calculated total bill to the particular user for payment of the total bill for the particular production item order, (xii) receiving a method of payment from the particular user to payment of the total bill, (xiii) confirming that the method of payment is valid and verified for payment of the total bill, (xiv) transmitting, the particular production item order for creation of the clothing or garment item for the particular production item, upon confirmation of valid and verified payment of the total bill per the method of payment provided by the particular user, to a production unit to create the clothing or garment item for the particular production item, and (xv) shipping the clothing or garment item for the particular production item to the particular user.

As stated above, the current (or existing) clothing design paradigm is largely based on designers and fashion labels creating clothing items which are most often sold to consumers through retail businesses. While most people purchase their clothing items from retail businesses and many of these consumers are satisfied with these clothing items designed by designers and labels and purchases via retail, there are often many other consumers who have particular needs with respect to clothing items, accessories, and the like. For instance, many consumers have trouble finding specific clothing items for their needs or as they wish. This is a problem for consumers who have conceptual ideas of specific clothing items they want or need but are unable to find the specific clothing items anywhere. Another problem with the existing clothing design paradigm is that many aspiring clothing designers lack experience and do not know where to begin with starting a fashion line. There are few options aside from making sketches of designs or one-off clothing. Even then, it is often difficult for aspiring designers to obtain certain materials or apparel construction items, since existing outlets typically carry only a limited range of items in stores. For instance, an aspiring designer may be able to produce a one-off clothing item design, but to produce a line of clothing is more challenging with limited resources in procuring materials needed for the design, and handling aspects related to scale.

Embodiments of the personalized garment and clothing design system and process described in this specification solve such problems by providing a cloud application service architecture for a platform whereby a user will be able to make the clothing and garment items they are looking for and to take it from concept to creation by interaction with the platform. For example, sometimes it is hard to find a specific look in the store and this platform will allow them to create a one-of-a-kind garment functional for their personal life. It also will be a one stop shop for someone starting a fashion line. It will allow the user to design and carry out their design all the way through production and shipping.

The personalized garment and clothing design system and process of the present disclosure solves the problem of someone not being able to find a specific clothing item they are looking for as they will be able to make it themselves. The personalized garment and clothing design system and process also provides an option for an aspiring clothing designer who does not know where to begin with starting a fashion line. As a platform, the personalized garment and clothing design system and process will enable such users to create as few as one item and up to as many units desired, or as many as needed for a company to fulfill their orders.

There are other devices that allow custom clothing to be made, however, the improvements offered via the personalized garment and clothing design system and process is in being able to provide limitless options of silhouettes, necklines, sleeves, etc., that have pattern pieces already made and which can be customized. As the personalized garment and clothing design system and process provides users a highly personalized and customizable way of creating clothing items or clothing lines, each user is able to create their own clothing item or garment, such that almost none will look alike. Furthermore, the personalized garment and clothing design system and process allows the user to access limitless options that are conveniently designed, produced, and shipped at the same site.

Thus, the personalized garment and clothing design system and process of the present disclosure takes the custom clothing option a step further than any of the existing, conventional clothing and garment design, procurement, and creation options. Not only can a person design a clothing item or garment (to be created as a one-off or as a clothing line), but each user can also find all fabrics, trims, options, etc., to custom design fabrics, add a pocket wherever needed or desired, add a zipper, string ties, patches, tassels, or other functional garment items or adornments. Then the user's design is actually produced and sent to them so they can wear it or start their own line and sell their custom designed garments.

Embodiments of the personalized garment and clothing design system and process described in this specification differ from and improve upon currently existing garment creation options. In particular, some embodiments differ by allowing the user to create their garment from scratch. Other platforms for creating and customizing clothing are limited in scale and scope, and often control various aspects of the creation process. Alternatively, some of the existing options or platforms are focused only on custom screen printing. However, none of the existing options enables a user to create their own pattern pieces, combine with any of a multitude of other garment and clothing items, visualize the design during creation, change scaling any level of granularity, and have the garment or clothing item (once designed)

assembled and created. By contrast, the personalized garment and clothing design system and process of the present disclosure does all that and more—allowing the user to have full control over the design of the garment and the creative process overall, from the initial concept until it is produced, shipped, and reaches the consumer.

The personalized garment and clothing design system and process of the present disclosure may be comprised of the following elements.

1. The user will log onto the website or app and can begin designing their garment. First, they will select a size and input measurements where a human figure will pop up and they can customize the figure to their measurements.

2. After the sizing is complete, the user can begin to build their garment. There will be a library of silhouettes consisting of different bodice silhouettes, from cropped, to fitted, to loose, etc.

3. The next step will allow the user to continue building their garment. They will already have chosen their bodice silhouette, next there will be a library of different necklines. The user will be able to click through the flat sketches of the different options and as they click, the interactive website will allow the user to see what that neckline option looks like on the bodice silhouette they have chosen.

4. After bodice silhouette and neckline have been selected, the user will browse through a library full of different sleeve options and select the one that suits their liking best for this garment. As they make their selection, the chosen item will appear on the fit model along with the other silhouettes they have selected thus far.

5. After sleeves, there will be a library full of assorted construction details, such as pockets, zippers, bows, buckles, etc. The user will be able to play with the sizes and alignments of these construction details and will be able to pick and chose however they would like to design their garment.

6. There is an option for bottoms where the user will be able to select bottoms from a library and where they will be able to customize their own bottoms.

7. The next step will allow the user to select their fabrics. They will be able to choose from a variety of different knits and woven in many different color ways. They will also be able to decide on which stitch they would like to use. Thus, as steps 2-7 demonstrate, as the user picks and chooses throughout the different libraries of bodices, necklines, sleeves, pockets, etc, the user will be able to see how the garment will change with the different silhouette options. They will also be able to see how their garment will look with a pattern fill of the fabric options and different color options. The garment will appear on the digital mannequin, which resembles a human figure customized based on their input sizes and other refinement details (hairstyle, skin tone, etc.). When the user is completed with designing their garment and is happy with the results, they will be able to order it and ship to themselves.

8. The price of the garment will be set up by an algorithm that calculates the bill of materials+production and profit margins to determine the retail price of the garment.

9. The next step, the user will pay for their garment and wait for delivery.

10. After payment, the order goes to distribution and production team as a completed (and validated) order.

11. The users have the option select quantity (single or mass production). In this way, the user can have as few as one item produced, or up to an unlimited number produced. This allows an option for beginning designers to create a clothing line if they do not know where to begin, it is a one stop shop for designing clothes.

12. The garment (in selected quantity from #11) will be cut, sewn and assembled before it is packaged and shipped back to the user.

To make the personalized garment and clothing design system and process of the present disclosure, a person would develop a website or mobile platform that is provided by a cloud application service. A mobile app and web apps allow the user to create their own clothing. The platform first requires the user to input the size the garment will be and input the measurements. Next a 3D human figure model will appear (also referred to as a "digital mannequin") and the user will be able to customize the digital mannequin in any way. Next they will be able to begin designing. The first step is to select a bodice silhouette from a library full of silhouettes. These would generally be the upper/torso apparel and garment items. As the user makes their selection, the clothing silhouette will appear on the digital mannequin. Once the user has made their bodice decision, they will next be able to choose a neckline. As they make their selection, the neckline will also appear on the digital mannequin, and it will appear on top of the bodice silhouette or join to the bodice. Next, the user will choose the sleeves for the garment from a library full of different sleeves, where they will also appear on the digital mannequin and attached to the clothing item they have been designing. Next they can choose to add any construction details to their garment. There will be a library full of pockets, zippers, bows, buckles, patches, tassels, and various other trims. The user will have the option to add bottoms to their look. They will be able to again browse a library full of different styles of bottoms. The next step they will be able to select fabrics and different types of stitching. The user will have a nearly unlimited variety of fabrics to choose from in multiple color ways. The designer will then have the option to create only one item, and have it produced and shipped to themselves, or if they are using the platform to create their own line, they have the option to create multiple pieces. An algorithm will be set up to determine the cost of the garment(s) and profit margin before the user purchases their item or items.

Generally, a pattern piece will be created for each item (e.g., bodice silhouette, neckline, sleeves, construction detail, etc.). Each pattern piece will have a full size run ranging from XS-XXL. Each item and pattern piece are given a number and that is how it is kept track of as it is being assembled (for layering, customization, layout, etc.). Once the item or items are made, they will be packaged and sent to the designer.

To use the personalized garment and clothing design system and process of the present disclosure, a person (or "user") looking for a specific clothing item and not being able to find it or a designer who is just starting out and does not know where to begin can connect to the cloud application service for the personalized garment and clothing design system to start. Once connected to the platform, the user would interact with the options and a digital mannequin and several tools to create a single, one-off design of a clothing item or garment, their own clothing line, or even their own prom dress, or a specific garment for work that has a pocket or a zipper in a place maybe only someone in that field needs. For example, a nurse could create a pair of scrubs that has a pocket or zipper in a convenient place that only a nurse would know needs extra storage because they have faced the inconvenience of not having it before. The personalized garment and clothing design system and process could help virtually anyone in any field who needs a garment specifically designed for them. The garment could help serve a purpose or function or it could be simply just a design aesthetic.

By way of example, FIG. 1 conceptually illustrates a personalized garment and clothing design process 100. The personalized garment and clothing design process 100 includes several steps akin to those steps described above. In this example, reference is made to several user interface (UI) screens or views in connection with FIGS. 2-13, by which a user is able to interact with the personalized garment and clothing design system to create customized, personalized clothing and garment items. Starting first with FIG. 1, the personalized garment and clothing design process 100 of some embodiments begins when the user connects, via a computing device (such as a computer, a laptop, a mobile smartphone, or a tablet computing device) over a public network (such as the Internet), to the personalized garment and clothing design service. Upon connection, the personalized garment and clothing design process 100 requires the user to log into the interactive clothing design web site (at 110). The interactive clothing design web site is provided as a platform starting point of the personalized garment and clothing design service. After successfully logging into the interactive clothing design website, the personalized garment and clothing design process 100 has the user select a type of digital mannequin (resembling a prototypical human figure) and input measurements to customize the digital mannequin (at 120). In some embodiments, the user inputs his or her own body measurements. Selection of a prototypical digital mannequin and body measurement input/selections are demonstrated by reference to FIG. 2, while a customized digital mannequin and related user interface tools are demonstrated by reference to FIG. 3.

Figure 2:
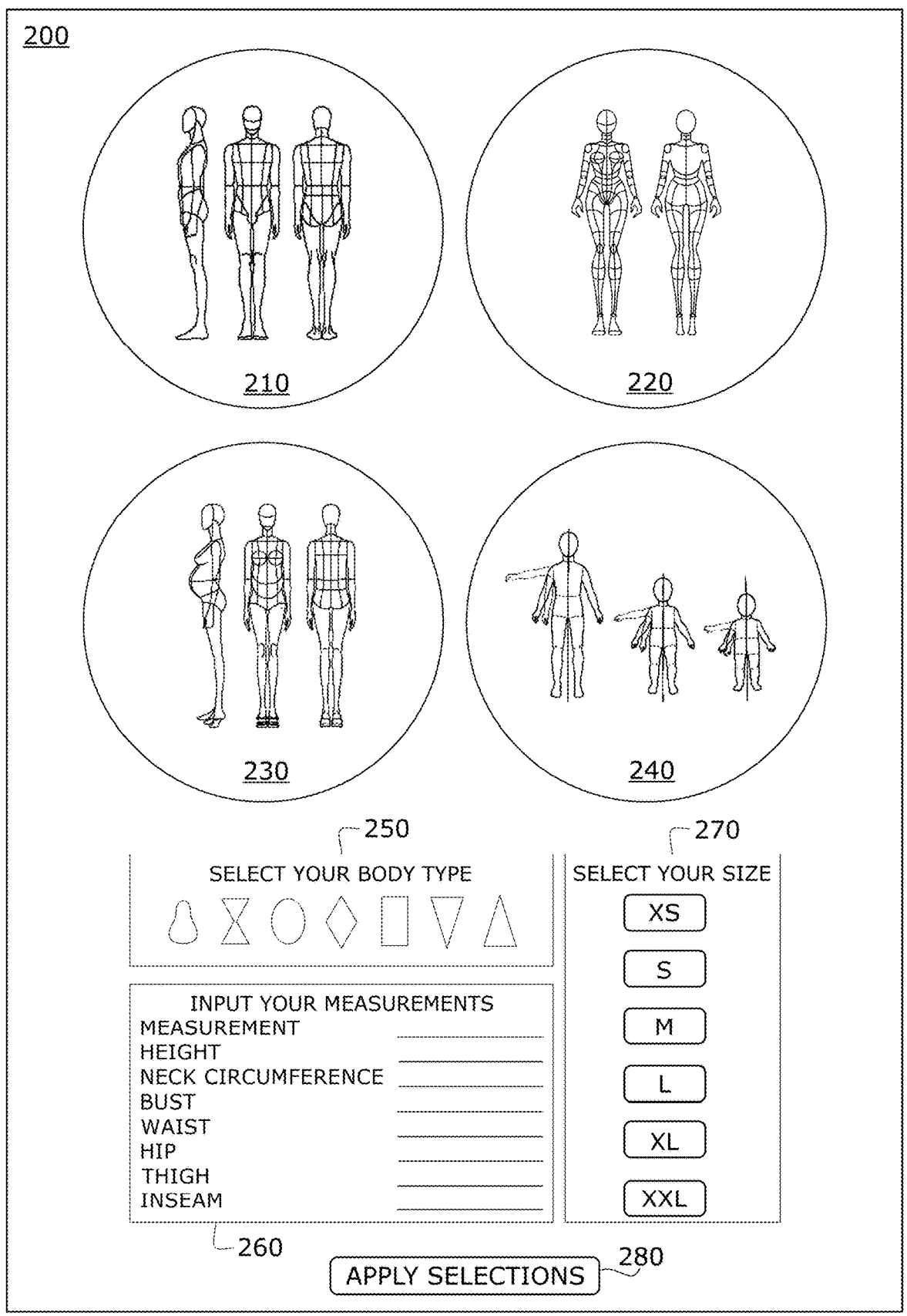
FIG. 2 conceptually illustrates a digital mannequin customization user interface (UI) of an interactive web site of a personalized garment and clothing design service hosted by a personalized garment and clothing design system in some embodiments.

In particular, FIG. 2 conceptually illustrates a digital mannequin customization user interface (UI) 200 of an interactive website of a personalized garment and clothing design service hosted by a personalized garment and clothing design system is shown. As illustrated in this figure, the digital mannequin customization UI 200 has several interactive elements comprising a first prototypical digital mannequin 210 resembling a human adult male, a second prototypical digital mannequin 220 resembling a human adult female, a third prototypical digital mannequin 230 resembling a human adult female with unborn child, a fourth prototypical digital mannequin 240 resembling a human child, a body type selection field 250, a body measurements input area 260, a size selection area 270, and a UI tool to apply the selections 280. In some embodiments, the UI tool to apply the selections 280 is not activated for user selection until the user has selected at least one type of prototypical digital mannequin, selected a body type from the body type selection field 250, entered body measurements in the body measurements input area 260, and selected a size in the size selection area 270. In some other embodiments, the UI tool to apply the selections 280 is activated after the user has made actions with respect either (i) making a selection of a particular prototypical digital mannequin or (ii) selecting a body type from the body type selection field 250, entering body measurements in the body measurements input area 260, and selecting a size in the size selection area 270.

In some embodiments, after the use clicks the UI tool to apply the selections 280 in the digital mannequin customization UI 200, the digital mannequin customization details (e.g., selection of a particular prototypical digital mannequin, a body type selection, input of body measurements, and/or a size selection) are transmitted from the computing device, operated by the user, to the personalized garment and clothing design service (or "cloud application service") to generate a three-dimensional (3D) model of the customized digital mannequin. After the cloud application service generates the 3D model, wireframe data points of the generated 3D model for the customized digital mannequin are transmitted back to the interactive website for rendering the customized digital mannequin as a 3D interactive model and display of the customized digital mannequin on a screen of the computing device of the user. In this way, the user will be able to rotate, resize, and otherwise manipulate the displayed customized digital mannequin to view different aspects of their clothing/garment creation while in progress or after completion. An example of the customized digital mannequin based on the user's selections and inputs in the digital mannequin customization UI 200 is demonstrated in FIG. 3.

Figure 3:
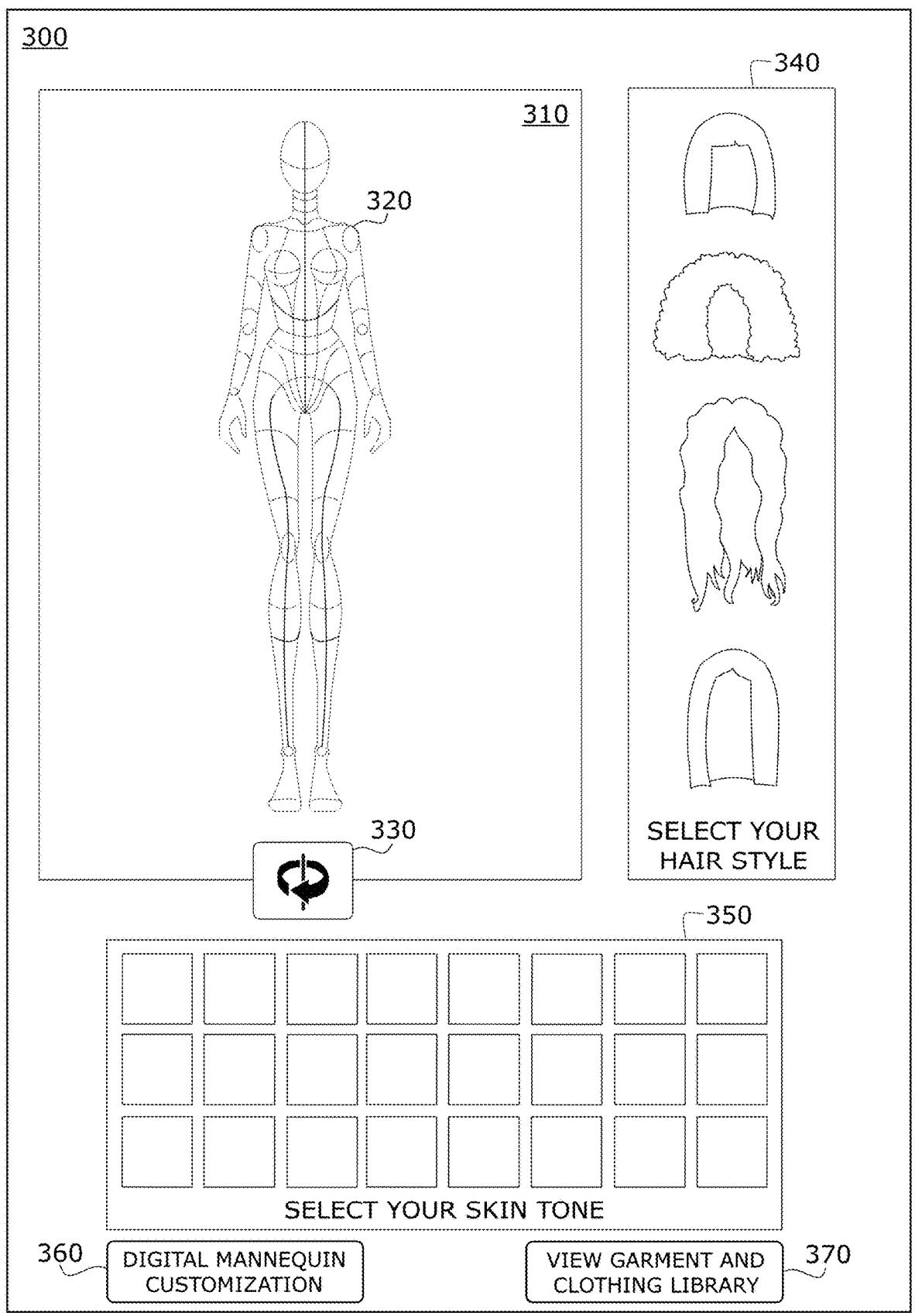
FIG. 3 conceptually illustrates a digital mannequin refined customization UI of the interactive web site of the personalized garment and clothing design service hosted by the personalized garment and clothing design system in some embodiments.

Specifically, FIG. 3 conceptually illustrates a digital mannequin refined customization UI 300 of the interactive website of the personalized garment and clothing design service hosted by the personalized garment and clothing design system. As shown in this figure, the digital mannequin refined customization UI 300 has several UI elements comprising a user interactive digital mannequin display area 310, the customized digital mannequin 320 shown as a 3D model, a rotation tool 330 for turning the 3D model of the customized digital mannequin 320 in the user interactive digital mannequin display area 310, a hairstyle selection field 340, a skin tone selection field 350, a digital mannequin customization back-link button 360, and garment and clothing library button 370 which, when selected by the user, presents several garment and clothing library options from which the user may select to create custom clothing and garment items. While the digital mannequin refined customization UI 300 only shows the rotation tool 330, in some embodiments, other types of 3D model viewing tools are shown for user selection including, without limitation, a resizing tool, a close-up viewing tool, and other such tools for viewing of the customized digital mannequin 320 and any clothing and garment items selected for display on the customized digital mannequin 320.

Now referring back to FIG. 1, the personalized garment and clothing design process 100 continues with a step for customizing, by the user, one or more clothing and garment types (at 130). The clothing and garment types include, without limitation, tops (also referred to as upper/torso), bottoms, dresses, jumpsuits, accessories, shoes, masks, bags, swimwear, menswear, children's wear, or other types of clothing and garments. This step occurs, for example, when the user selects the garment and clothing library button 370 shown in the digital mannequin refined customization UI 300, described above by reference to FIG. 3. Specifically, when the garment and clothing library button 370 is selected by the user, another user interface view is presented for display, showing several garment and clothing library options from which, the user may select to create custom clothing and garment items. An example of such a user interface is demonstrated in FIG. 4.

Figure 4:
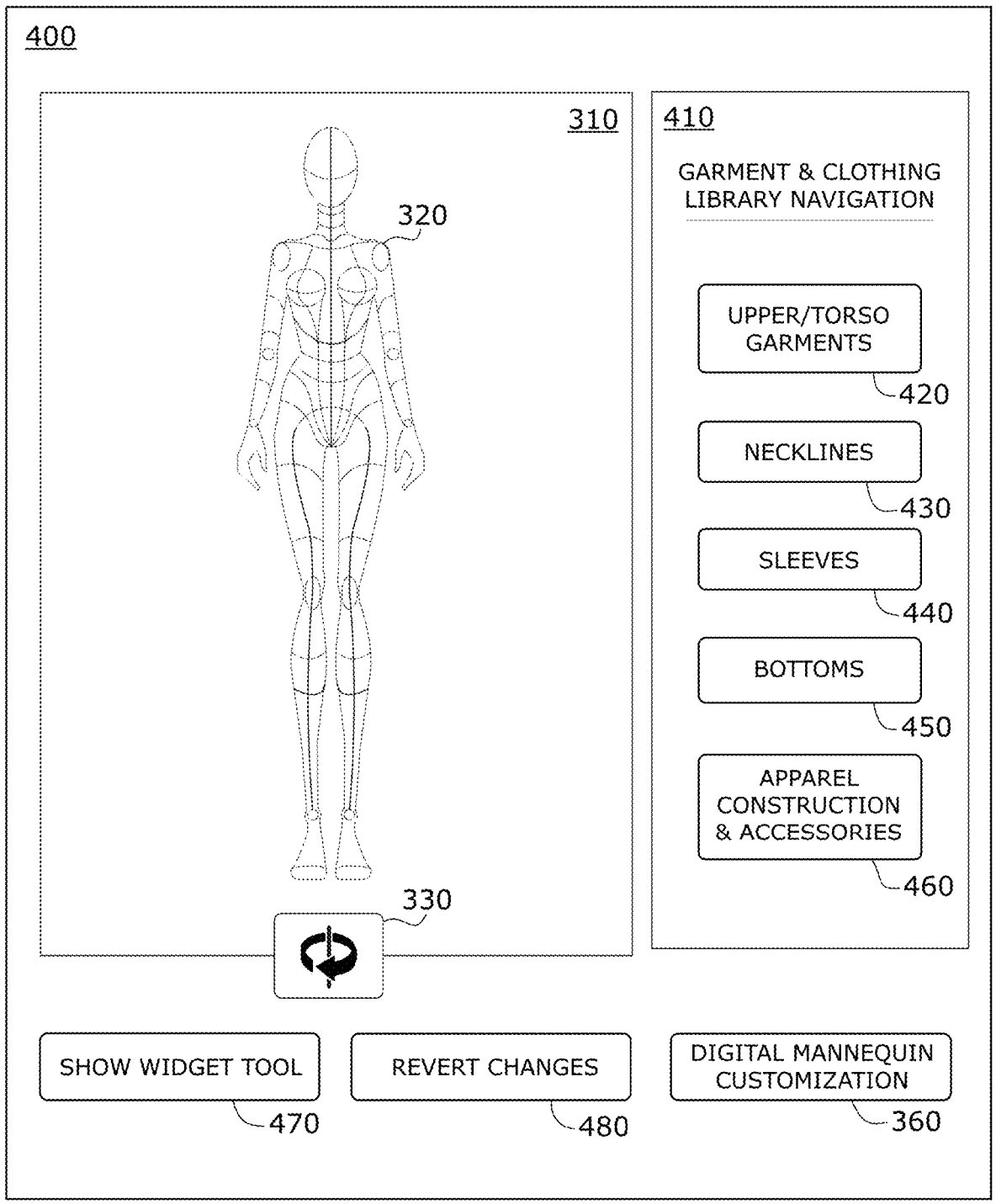
FIG. 4 conceptually illustrates a garment and clothing library UI of the interactive website of the personalized garment and clothing design service hosted by the personalized garment and clothing design system in some embodiments.

By way of reference, FIG. 4 conceptually illustrates a garment and clothing library UI 400 of the interactive website of the personalized garment and clothing design service hosted by the personalized garment and clothing design system. As shown in this figure, the garment and clothing library UI 400 has several UI elements comprising the user interactive digital mannequin display area 310, the customized digital mannequin 320, the rotation tool 330, a garment & clothing library navigation selection field 410 with several UI buttons to navigate to particular garment and clothing item libraries, a widget UI tools button 470 to shown several UI tools for the user to change, modify, and/or customize selected items, a revert changes UI button 480 to remove changes from the customized digital mannequin 320, and the digital mannequin customization back-link button 360 which, when selected, allows the user to start the digital mannequin customization process over from the digital mannequin customization UI 200, described above by reference to FIG. 2.

The garment & clothing library navigation selection field 410 with several UI buttons to navigate to particular garment and clothing item libraries allow the user to select any of several pre-populated libraries of garments and clothing items. In each case, the user can also add items to the respective libraries, and the added items are saved as custom library additions for the user (but not necessarily shown to other users). The several UI buttons in the garment & clothing library navigation selection field 410 shown in this figure include an upper/torso garments library navigation UI button 420, a necklines library navigation UI button 430, a sleeves library navigation UI button 440, a bottoms library navigation UI button 450, and an apparel construction & accessories library navigation UI button 460. The upper/torso garments library navigation UI button 420 navigates to a library of upper/torso (or "tops") garments, an example of which is described below, by reference to FIG. 5. The necklines library navigation UI button 430 navigates to a necklines library, an example of which is described below, by reference to FIG. 6. The sleeves library navigation UI button 440 navigates to a sleeves library, an example of which is described below, by reference to FIG. 7. The bottoms library navigation UI button 450 navigates to a bottoms library, an example of which is described below, by reference to FIG. 8. Finally, the apparel construction & accessories library navigation UI button 460 navigates to an apparel construction & accessories library, an example of which is described below, by reference to FIG. 9. The widget UI tools button 470 launches an interface from which the user can select different UI tools to change, modify, and/or customize selected items, an example of which is described below, by reference to FIG. 10. Thus, from the garment and clothing library UI 400, the user is able to access any of several libraries in each area or each type of article of clothing/garment, with additional options as provided by the several different widget UI tools for manipulation of selected items or enhanced views of those items and any changes made to selected items on the customized digital mannequin.

Now, turning back to FIG. 1, the personalized garment and clothing design process 100 proceeds to the step for accessing a library of clothing and garment items (at 140), by the user, to customize any article of clothing or garment with placement, styles, and construction details of any such article of clothing or garment (including, without limitation, necklines, sleeves, pockets, zippers, bows, buckles, patches, tassels, and various other trims).

Figure 5:
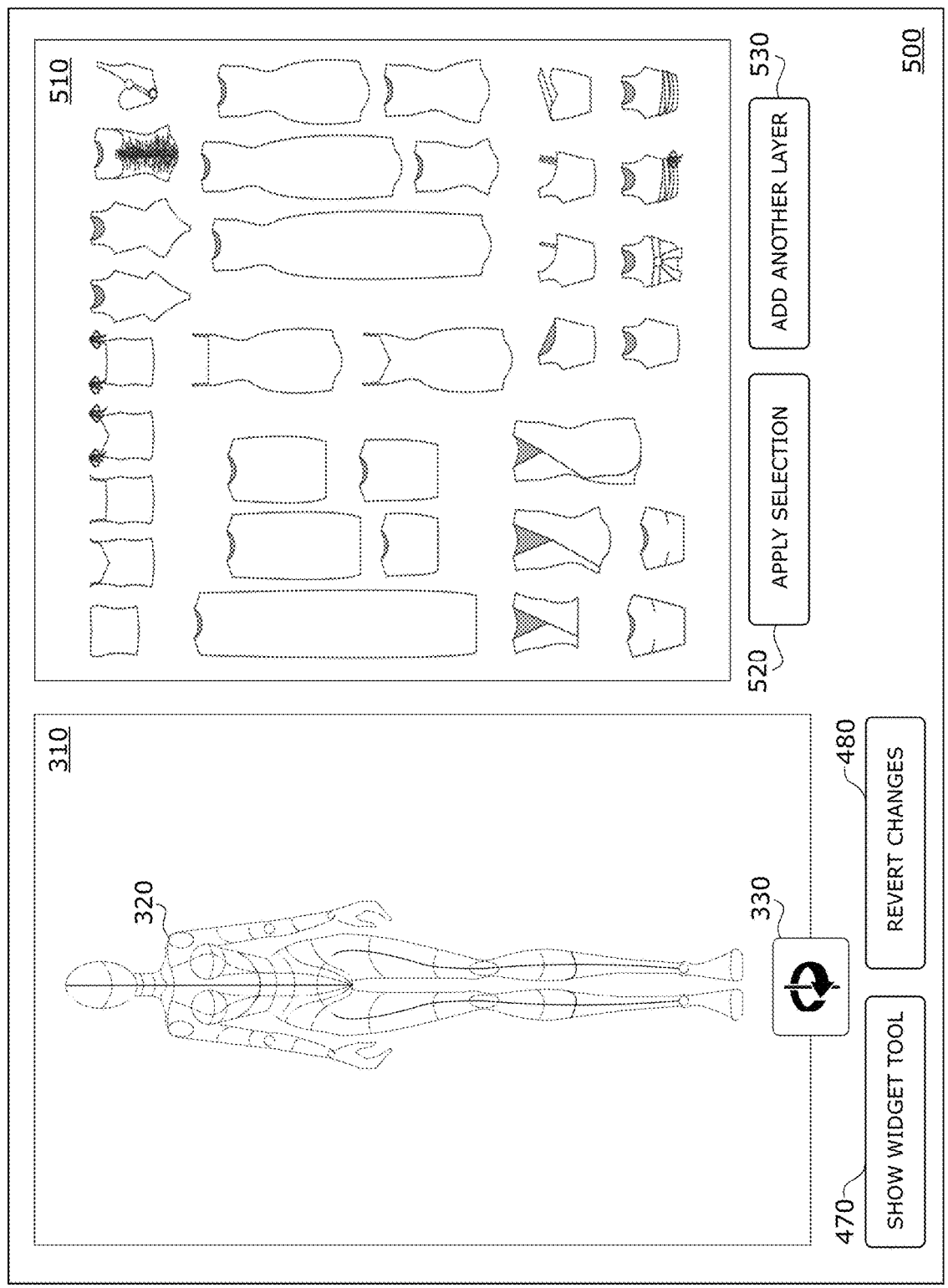
FIG. 5 conceptually illustrates an upper/torso tops garment and clothing selection UI of the interactive website of the personalized garment and clothing design service hosted by the personalized garment and clothing design system in some embodiments.

By way of example, FIG. 5 conceptually illustrates an upper/torso tops garment and clothing selection UI 500 (also referred to as the "tops selection UI 500") of the interactive website of the personalized garment and clothing design service hosted by the personalized garment and clothing design system. The tops selection UI 500 is triggered to display a library of upper/torso tops garment and clothing items when the user selects, for example, the upper/torso garments library navigation UI button 420 from the garment and clothing library UI 400, described above by reference to FIG. 4. As shown in this figure, the tops selection UI 500 has several UI elements comprising the user interactive digital mannequin display area 310, the customized digital mannequin 320, the rotation tool 330, the widget UI tools button 470, the revert changes UI button 480, a tops display and selection field 510, an apply selection UI button 520, and an add another layer UI button 530. When viewing and interacting with the tops selection UI 500 the user can select any displayed item in the tops display and selection field 510. The tops display and selection field 510 is configured to highlight the user selected item and wait for a user action or another selection. The apply selection UI button 520 is configured to apply any selected item in the tops display and selection field 510 to the customized digital mannequin 320 shown in the user interactive digital mannequin display area 310. The add another layer UI button 530 is configured to allow additional items to be selected from the tops display and selection field 510 after at least one item has been applied to the customized digital mannequin 320 shown in the user interactive digital mannequin display area 310. Thus, after the user selects one "tops" item in the tops display and selection field 510 and selects the apply selection UI button 520, the one selected top will be displayed "on" the customized digital mannequin 320. Then, if the user selects the add another layer UI button 530, the user may select a second item in the tops display and selection field 510, followed by selecting the apply selection UI button 520, which will then cause the second selected item to be displayed "on" the customized digital mannequin 320. In some embodiments, other tools for changing a layering order of items displayed on the customized digital mannequin 320 are made available for user selection to further enhance the ability of the user to create clothing and garment items.

Note that selecting the apply selection UI button 520 is required to render and display any clothing or garment item (as selected in any of the following user interfaces) to the customized digital mannequin 320 shown in the user interactive digital mannequin display area 310. Similarly, selecting the add another layer UI button 530 is required to render and display any clothing or garment item (as selected in any of the following user interfaces) to the customized digital mannequin 320 shown in the user interactive digital mannequin display area 310 without causing the most recently selected clothing or garment item applied (via the apply selection UI button 520) to the customized digital mannequin 320 to be removed from display on the customized digital mannequin 320. On the other hand, if the user has already selected and applied a clothing/garment item, and then added a layer to select and apply another, different clothing/garment item, the user still has a way to remove clothing or garment items that have been rendered for display on the customized digital mannequin 320. Specifically, the customized digital mannequin 320 is displayed in the user interactive digital mannequin display area 310, which is configured to allow direct user interaction. In this way, the user can "select" any clothing or garment item that is presently rendered and displayed on the customized digital mannequin 320. When the selected clothing or garment item on the customized digital mannequin 320 is one that the user wishes to remove but is one that was added to a layer that is several layers down from the most recently added layer, then the user merely has to select the revert changes UI button 480 to remove the rendered and displayed clothing or garment item from the customized digital mannequin 320. Selection of the revert changes UI button 480 also removes the layer to which the selected clothing or garment item was applied to the customized digital mannequin 320. While one function of the revert changes UI button 480 is to remove such clothing/garment items and layers from the customized digital mannequin 320, another use of the revert changes UI button 480 is to revert changes to particular items rendered and displayed, such as changes to color, fabric, knits, woven, sizes, layout, cutouts, etc.

Figure 6:
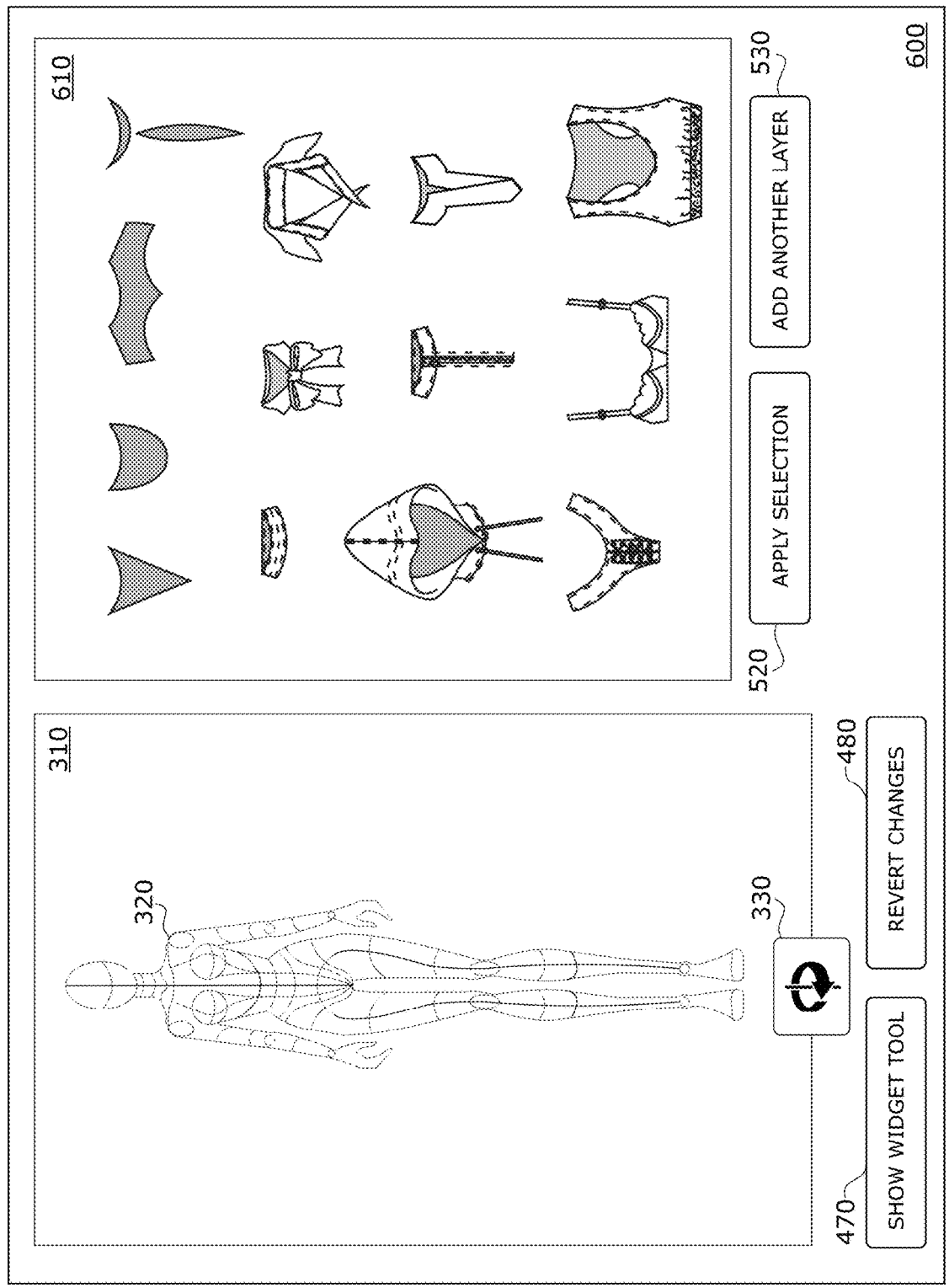
FIG. 6 conceptually illustrates a necklines selection UI of the interactive website of the personalized garment and clothing design service hosted by the personalized garment and clothing design system in some embodiments.

Now turning to another example, FIG. 6 conceptually illustrates a necklines selection UI 600 of the interactive website of the personalized garment and clothing design service hosted by the personalized garment and clothing design system. The necklines selection UI 600 is triggered to display a library of neckline garment and clothing items when the user selects, for example, the necklines library navigation UI button 430 from the garment and clothing library UI 400, described above by reference to FIG. 4. As shown in this figure, the necklines selection UI 600 has several UI elements comprising the user interactive digital mannequin display area 310, the customized digital mannequin 320, the rotation tool 330, the widget UI tools button 470, the revert changes UI button 480, the apply selection UI button 520, the add another layer UI button 530, and a necklines display and selection field 610. When viewing and interacting with the necklines selection UI 600 the user can select any displayed item in the necklines selection UI 600. In some cases, the customized digital mannequin 320 may be displayed in the user interactive digital mannequin display area 310 with one or more other clothing and garment items that have previously been "applied" by, for example, user selection of the apply selection UI button 520 or by loading a previously saved user project with items already selected. As noted above for the tops display and selection field 510, described by reference to FIG. 5, the necklines display and selection field 610 is configured to highlight any user selected neckline item and wait for a user action or another selection. For instance, the user selects a first neckline item and then, before selecting the apply selection UI button 520, the user selects a different, second neckline item—in this case, only the second neckline item would be highlighted in the necklines display and selection field 610. Similarly, if the user selects the first neckline item in the necklines display and selection field 610, followed by selection of the apply selection UI button 520, the first neckline item will be rendered for display on the customized digital mannequin 320 in the user interactive digital mannequin display area 310; but if the user then selects a different second neckline item in the necklines display and selection field 610, followed by a selection of the apply selection UI button 520, the first neckline item will be removed from the customized digital mannequin 320 in the user interactive digital mannequin display area 310, with the different second neckline item being rendered for display on the customized digital mannequin 320 instead of the first neckline item. The only way for the user to keep both the first and second neckline items rendered for display on the customized digital mannequin 320 in the user interactive digital mannequin display area 310 is by the user selecting the add another layer UI button 530 after the first neckline item is selected and applied to the customized digital mannequin 320 and before the user selects the apply selection UI button 520 with respect to the different second neckline item.

Figure 7:
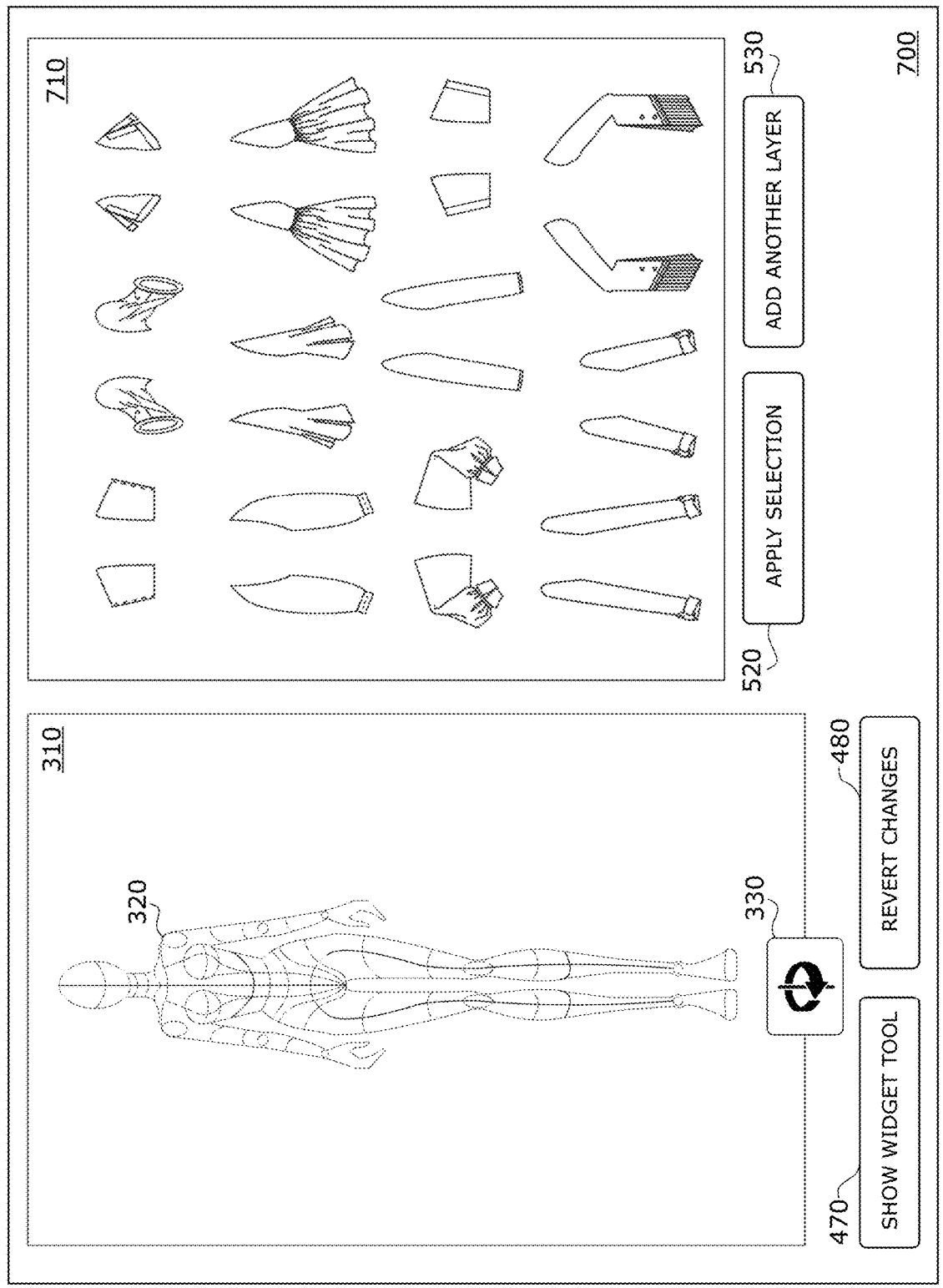
FIG. 7 conceptually illustrates a sleeves selection UI of the interactive website of the personalized garment and clothing design service hosted by the personalized garment and clothing design system in some embodiments.

By reference to another example, FIG. 7 conceptually illustrates a sleeves selection UI 700 of the interactive website of the personalized garment and clothing design service hosted by the personalized garment and clothing design system. The sleeves selection UI 700 is triggered to display a library of sleeves garment and clothing items when the user selects, for example, the sleeves library navigation UI button 440 from the garment and clothing library UI 400, described above by reference to FIG. 4. As shown in this figure, the sleeves selection UI 700 has several UI elements comprising the user interactive digital mannequin display area 310, the customized digital mannequin 320, the rotation tool 330, the widget UI tools button 470, the revert changes UI button 480, the apply selection UI button 520, the add another layer UI button 530, and a sleeves display and selection field 710. Specifically, the sleeves display and selection field 710 works similar to the tops display and selection field 510, described above by reference to FIG. 5, or the necklines display and selection field 610, described above by reference to FIG. 6, in that it is configured to allow the user to interact and directly select items displayed within. Note, however, that the sleeves display and selection field 710 is configured to select "pairs" of sleeves when the user selects only one sleeve in a pair of corresponding sleeves shown within the sleeves display and selection field 710. As before, the apply selection UI button 520 would apply the selected sleeves to the arms of the customized digital mannequin 320, where the user would be able to manipulate the manner of placement on the 3D model according to the particular design being created by the user.

Figure 8:
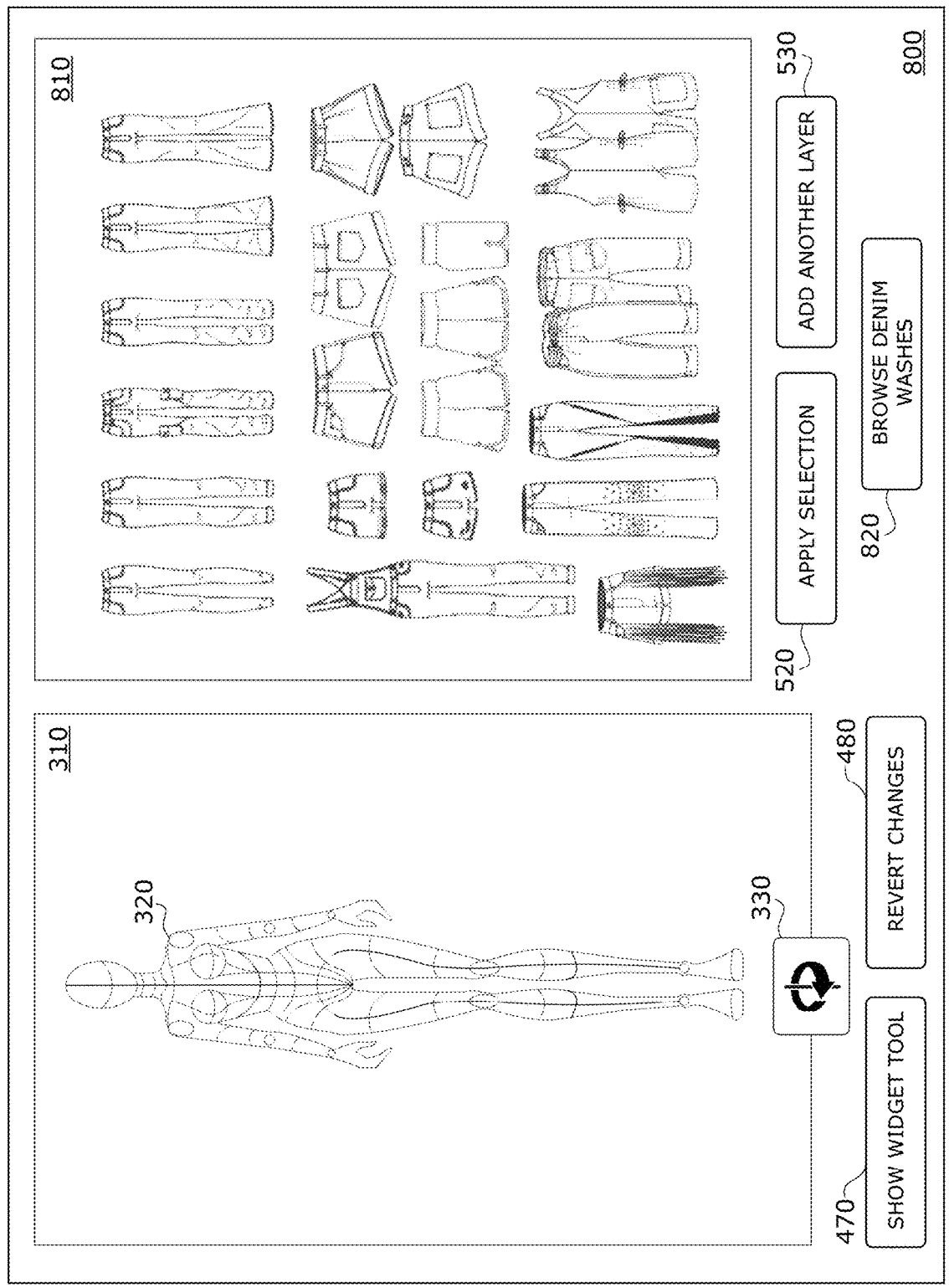
FIG. 8 conceptually illustrates a bottoms selection UI of the interactive website of the personalized garment and clothing design service hosted by the personalized garment and clothing design system in some embodiments.

Turning now to FIG. 8, a bottoms selection UI 800 of the interactive website of the personalized garment and clothing design service hosted by the personalized garment and clothing design system. The bottoms selection UI 800 is triggered to display a library of bottoms garment and clothing items when the user selects, for example, the bottoms library navigation UI button 450 from the garment and clothing library UI 400, described above by reference to FIG. 4. As shown in this figure, the bottoms selection UI 800 has several UI elements comprising the user interactive digital mannequin display area 310, the customized digital mannequin 320, the rotation tool 330, the widget UI tools button 470, the revert changes UI button 480, the apply selection UI button 520, the add another layer UI button 530, and a bottoms display and selection field 810. As before, the bottoms display and selection field 810 works similar to the tops display and selection field 510, described above by reference to FIG. 5, the necklines display and selection field 610, described above by reference to FIG. 6, and the sleeves display and selection field 710, described above by reference to FIG. 7, in that it is configured to allow the user to interact and directly select the displayed "bottoms" clothing and garment items. In some embodiments, when the user selects a denim "bottoms" item from the bottoms display and selection field 810, a browse denim washes UI button 820 is activated in the bottoms selection UI 800. The user can select the browse denim washes UI button 820 to select particular denim washes to configure for the denim "bottoms" item selected from within the bottoms display and selection field 810. Also, selection by the user of the apply selection UI button 520 would apply the selected bottoms to the legs and pelvic area of the customized digital mannequin 320, automatically orienting the display of the rendered bottoms according to the front/back orientation of the customized digital mannequin 320. Once applied, rendered, and displayed on the customized digital mannequin 320, the user would be able to manipulate the manner of placement of the bottoms as needed or desired. Also, when a "bottoms" selection is made of denim material, the particular selected denim wash is shown on the garment displayed on the mannequin 320. The user can also change the denim wash selection to a different denim wash after the denim "bottoms" item is applied to the mannequin 320. For instance, after selecting a denim "bottoms" item and applying the selection (by click the apply selection UI button 520) to the digital mannequin 320, the user may click the browse denim washes UI button 820 to select a different denim wash style, or successively select each of several different denim wash styles to see them as they appear on the digital mannequin 320 for each selection.

Figure 9:
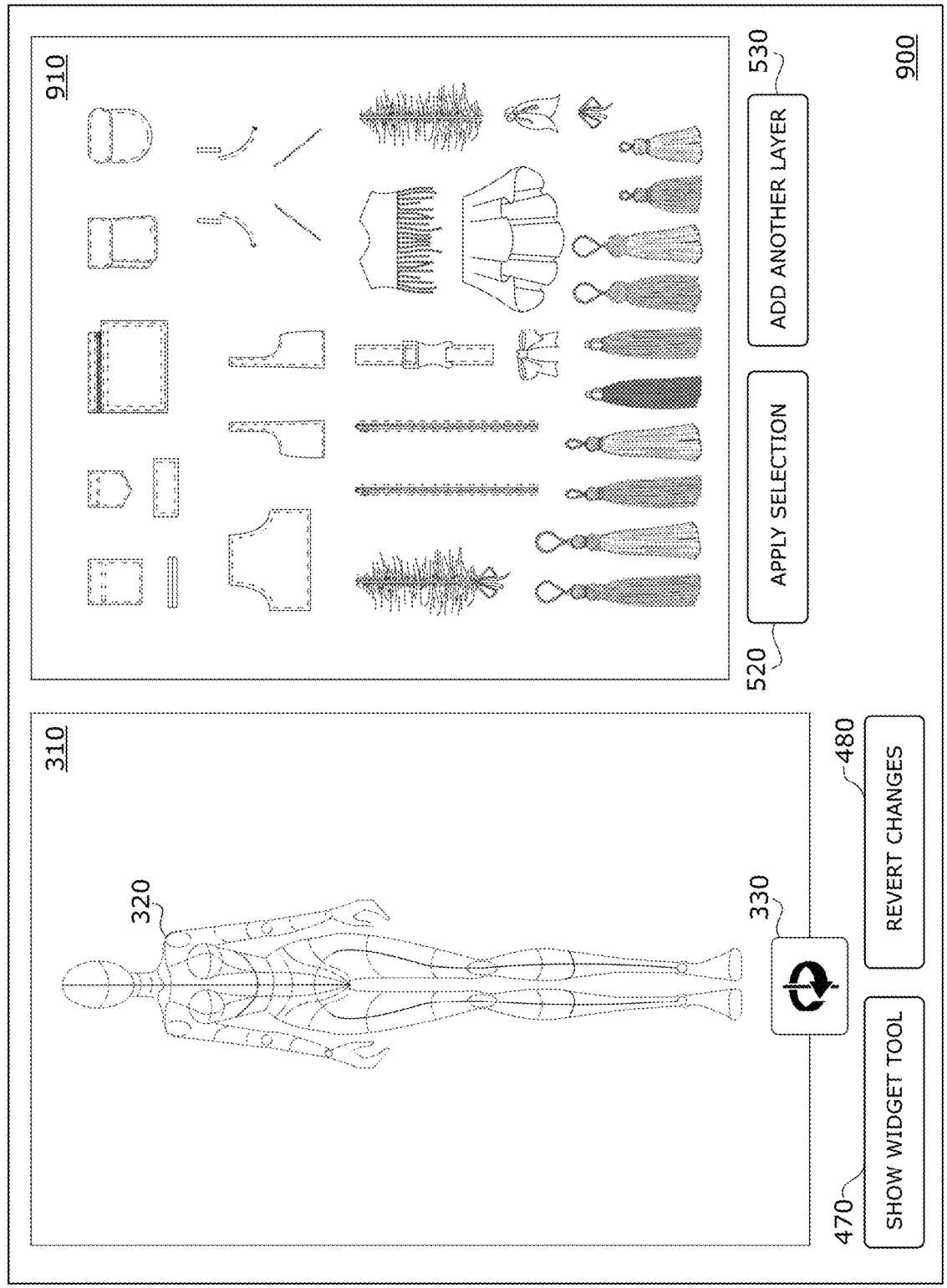
FIG. 9 conceptually illustrates an apparel construction & accessories selection UI of the interactive website of the personalized garment and clothing design service hosted by the personalized garment and clothing design system in some embodiments.

By way of example, FIG. 9 conceptually illustrates an apparel construction & accessories selection UI 900 of the interactive website of the personalized garment and clothing design service hosted by the personalized garment and clothing design system. The apparel construction & accessories selection UI 900 is triggered to display a library of upper/torso tops garment and clothing items when the user selects, for example, the apparel construction & accessories library navigation UI button 460 from the garment and clothing library UI 400, described above by reference to FIG. 4. As shown in this figure, the apparel construction & accessories selection UI 900 has several UI elements comprising the user interactive digital mannequin display area 310, the customized digital mannequin 320, the rotation tool 330, the widget UI tools button 470, the revert changes UI button 480, the apply selection UI button 520, the add another layer UI button 530, and an apparel construction & accessories display and selection field 910. As before, the apparel construction & accessories display and selection field 910 works similar to the tops display and selection field 510, described above by reference to FIG. 5, the necklines display and selection field 610, described above by reference to FIG. 6, the sleeves display and selection field 710, described above by reference to FIG. 7, and the bottoms display and selection field 810, described above by reference to FIG. 8, in that it is configured to allow the user to interact and directly select the displayed apparel construction & accessory items. However, selection by the user of the apply selection UI button 520 works a little differently in this case. Specifically, the user may either select (from any layer) a clothing or garment item that is rendered and displayed the customized digital mannequin 320 to which the selected apparel/accessory item would be applied when rendered and displayed on the customized digital mannequin 320. Once displayed, the user could move or reorient the apparel/accessory item with respect to the clothing or garment item to which it is presently applied, or elevate or demote the item to a different layer for application to any other clothing or garment displayed on the customized digital mannequin 320.

Turning back to FIG. 1, the next step of the personalized garment and clothing design process 100 involves the user interacting with a set of clothing and garment customization and display viewing user interface (UI) tools (including a widget UI tool, a rotate UI tool, and a cut-out UI tool). An example of an interface from which the user can select different UI tools to change, modify, and/or customize selected items is described next, by reference to FIG. 10. Although this step is not shown in this figure, a description is included here due to its central importance in providing full creative control to the user in creating a particular design/style of a clothing item or garment. Also, while this step of the personalized garment and clothing design process 100 is described in the sequence of steps for the personalized garment and clothing design process 100 as following the step for accessing a library of clothing and garment items (at 140) and preceding a step at which the user selects fabrics, knits, woven, colors, and stitching (at 150), the user interaction with the set of clothing and garment customization and display viewing user interface (UI) tools (including any or all of the widget UI tool, the rotate UI tool, and the cut-out UI tool) can occur anytime the user triggers the tools. In some embodiments, the set of clothing and garment customization and display viewing user interface (UI) tools are automatically displayed in the user interface anytime the customized digital mannequin is displayed. Furthermore, several of the UI views described above include the widget UI tools button 470 which, when selected (or clicked) by the user, launches the interface from which the user can select different UI tools to change, modify, and/or customize selected items. The example in those UI views also referred to FIG. 10.

Figure 10:
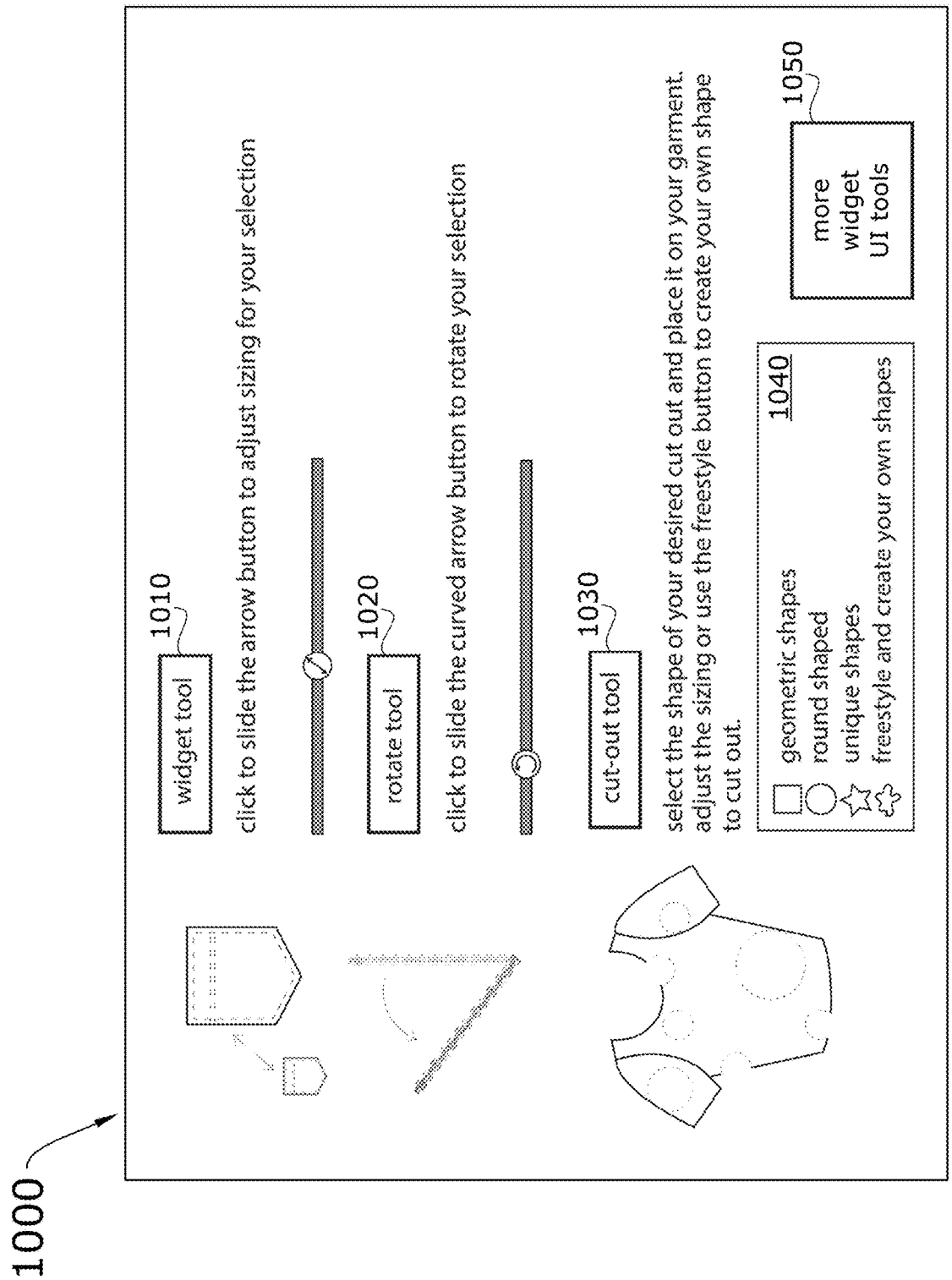
FIG. 10 conceptually illustrates clothing and garment customization and display viewing tools UI of the interactive website of the personalized garment and clothing design service hosted by the personalized garment and clothing design system in some embodiments whereby the user can select from among a set of clothing and garment customization and display viewing UI tools for modifying and customizing selection clothing and garment items displayed on the digital mannequin.

By way of example, FIG. 10 conceptually illustrates clothing and garment customization and display viewing tools UI 1000 (also referred to as "widget UI tools selection interface 1000") of the interactive website of the personalized garment and clothing design service hosted by the personalized garment and clothing design system. The widget UI tools selection interface 1000 is configured to allow the user to select from among a set of clothing and garment customization and display viewing UI tools for modifying and customizing selected clothing and garment items displayed on the customized digital mannequin 320. In some embodiments, the widget UI tools selection interface 1000 is displayed in a separate window that hovers over any other interface and/or digital mannequin view currently active for the user. In some embodiments, the user can minimize the widget UI tools selection interface 1000 to remove it from its hovering position. In some embodiments, the user can move the location at which the separate window hovers, thereby positioning the widget UI tools selection interface 1000 at a hover location that minimizes obstruction of view of other interfaces. By way of example, the widget UI tools selection interface 1000 is shown hovering above another interface and digital mannequin view, as described below, by reference to FIG. 14. Referring presently to FIG. 10, the widget UI tools selection interface 1000 includes a widget tool 1010 (also referred to as a "size tool 1010"), an item rotate tool 1020, a cut-out tool 1030, a plurality of shapes 1040, and a selectable link to more widget UI tools 1050.

In some embodiments, the widget tool 1010 that allows the user to change the size of a selected item by clicking and sliding an arrow button or handle left or right to decrease or increase size of the selected item. In some embodiments, the item rotate tool 1020 applies rotation effects to any clothing or garment item selected from the user interactive digital mannequin display area 310 and displayed on the customized digital mannequin 320. The item rotate tool 1020 is different from the rotation tool 330, which applies rotation effects to the 3D model figure represented by the customized digital mannequin 320 in the user interactive digital mannequin display area 310. In some embodiments, the cut-out tool 1030 is configured to allow the user to make cut outs to any clothing or garment item selected from the user interactive digital mannequin display area 310 and displayed on the customized digital mannequin 320. In some embodiments, the cut-out tool 1030 provides a plurality of shapes 1040 from which the user may choose as a cut-out shape to apply to the selected clothing or garment item. In some embodiments, when a user clicks or selects within a box surrounding the plurality of shapes 1040, a create shape tool is launched and visually output as a hovering tool over the present user interface view. An example of a create shape tool is described below, by reference to FIG. 23. In some embodiments, the plurality of shapes 1040 comprise a plurality of geometric shapes, a plurality of round shapes, a plurality of unique shapes, and a freestyle tool that configured to allow the user to create a custom shape. Examples of geometric shapes provided via the cut-out tool 1030 include, without limitation, squares, rectangles, triangles, etc. Examples of round shapes provided via the cut-out tool 1030 include, without limitation, circles, ovals, etc. Examples of unique shapes provided via the cut-out tool 1030 include, without limitation, star shapes, lightning shapes, cloud shapes, etc. To use the cut-out tool 1030, the user would select a shape (or design a custom shape), and then apply the selected shape to the selected clothing or garment item on the customized digital mannequin 320 displayed in the user interactive digital mannequin display area 310.

Also, the selectable link to more widget UI tools 1050 is user-selectable, such that when the user clicks or selects within the surrounding box link to more widget UI tools 1050, a tools interface is visually output from which the user can select any of several other UI tools. Non-limiting examples of several other UI tools from which the user may select are described below, by reference to FIGS. 15-25.

Now referring back to FIG. 1, the next step of the personalized garment and clothing design process 100 involves the user selecting (at 150) fabrics, knits, woven, colors, and stitching, hems/hemlines, among other optional choices by the user.

Figure 11:
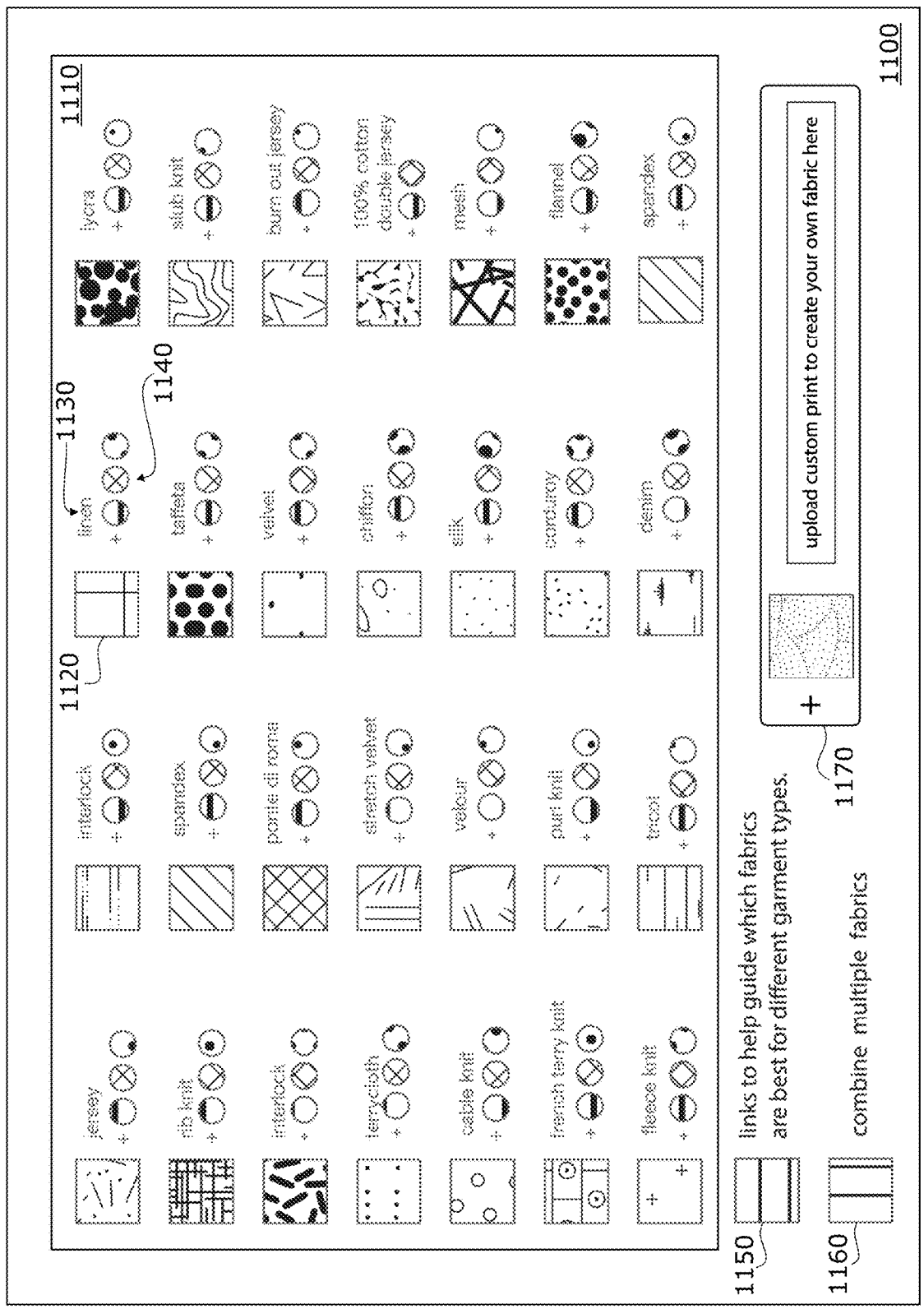
FIG. 11 conceptually illustrates a knits and fabrics selection UI of the interactive website of the personalized garment and clothing design service hosted by the personalized garment and clothing design system in some embodiments.

By way of example, FIG. 11 conceptually illustrates a knits and fabrics selection UI 1100 of the interactive website of the personalized garment and clothing design service hosted by the personalized garment and clothing design system. The knits and fabrics selection UI 1100 is configured to allow the user to select from various knits and fabrics and associated color for selected knits or fabrics. As shown in this figure, the knits and fabrics selection UI 1100 has several knit/fabric items that can be selected by the user from a knit and fabric selection interface 1110. Each knit/fabric item has a knit/fabric thumbnail preview 1120, a knit/fabric name 1130, and a plurality of knit/fabric colors 1040 which the user may choose by selection of a '+' tool followed by selection of a particular color. The knits and fabrics selection UI 1100 also includes a selectable tool for links to help guides 1150, a combination tool 1160 whereby the user may combine different knits/fabrics, and a custom print knit/fabric tool 1170. The knits/fabrics and corresponding colors and options are thereafter applied to the clothing and garment items selected on the customized digital mannequin 320. While not shown in this figure, the knits and fabrics selection UI 1100 is able to show the user interactive digital mannequin display area 310, the customized digital mannequin 320, the rotation tool 330, the widget UI tools button 470, and the revert changes UI button 480 as in the other user interfaces described above by reference to FIGS. 4-9.

Figure 12:
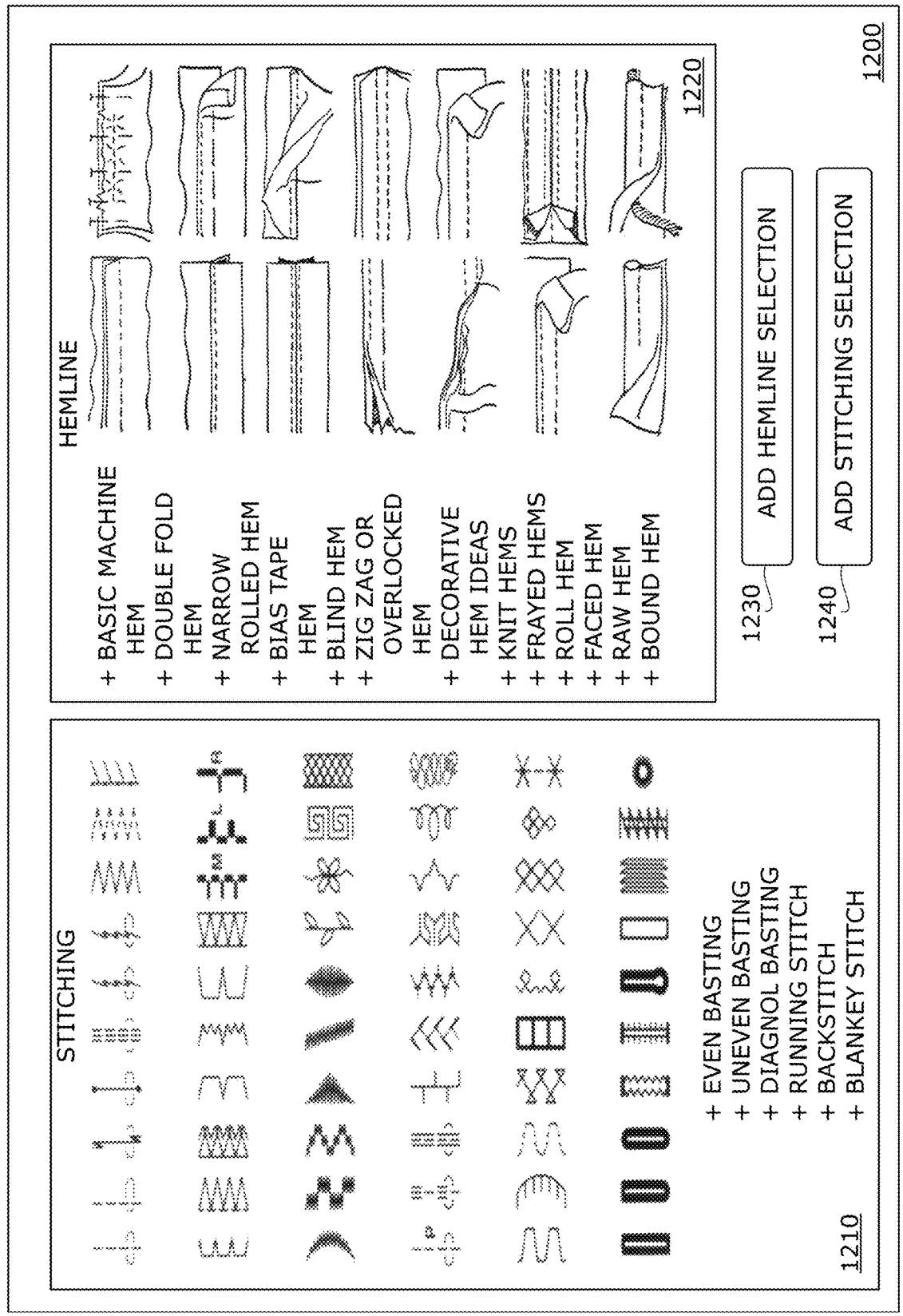
FIG. 12 conceptually illustrates a stitching and hemline selection UI of the interactive website of the personalized garment and clothing design service hosted by the personalized garment and clothing design system in some embodiments.

By way of another example, FIG. 12 conceptually illustrates a stitching and hemline selection UI 1200 of the interactive website of the personalized garment and clothing design service hosted by the personalized garment and clothing design system. The stitching and hemline selection UI 1200 is configured to allow the user to select from various stitches and hems for their custom clothing or garment creation. As shown in this figure, the stitching and hemline selection UI 1200 provides the user access to a plurality of stitches in a stitching selection field 1210 from which the user may select one or more for stitching to apply to areas of the clothing or garment items on the customized digital mannequin and for designing the final clothing or garment item to be produced. Similarly, the stitching and hemline selection UI 1200 provides the user access to a plurality hemlines in a hemline selection field 1220 from which the user may select one or more hemlines to apply to areas of the clothing or garment items on the customized digital mannequin and for designing for the final clothing or garment item to be produced. The plurality of stitches in the stitching selection field 1210 include stitch versions at least (i) even basting, (ii) uneven basting, (iii) diagonal basting, (iv) running stitch, (v) backstitch, and (vi) blankey stitch. The plurality of hemlines in the hemline selection field 1220 include hemline versions of at least (i) basic machine hem, (ii) double fold hem, (iii) narrow rolled hem, (iv) bias tape hem, (v) blind hem, (vi) zig zag or overlocked hem, (vii) decorative hem ideas, (viii) knit hems, (ix) frayed hems, (x) roll hem, (xi) faced hem, (xii) raw hem, and (xiii) bound hem. The stitching and hemline selection UI 1200 also includes a hemline selection adding tool 1230 and a stitch selection adding tool 1240. When the user selects a stitch in the stitching selection field 1210, the user would then need to click the stitch selection adding tool 1240 to add the stitch to the bill of materials. When the user selects a hemline in the hemline selection filed 1220, the user would also need to click the hemline selection adding tool 1230 to add the selected hemline to the bill of materials. Although not shown in this figure, the stitching and hemline selection UI 1200 is able to show the user interactive digital mannequin display area 310, the customized digital mannequin 320, the rotation tool 330, the widget UI tools button 470, and the revert changes UI button 480 as in the other user interfaces described above by reference to FIGS. 4-9.

Turning back to FIG. 1, after the user has made selections for stitching/hemlines, as needed, the next step of the personalized garment and clothing design process 100 involves automatically calculating, by a garment calculation algorithm, a bill of materials for all the selected clothing and garment materials, production, profit, taxes, shipping, and additional fees as per user selections (at 160). Next, the personalized garment and clothing design process 100 presents the calculated total bill to the user (at 170). The total bill is calculated and presented to the user for payment based on the quantity of clothing items to create (i.e., only one to produce or multiple copies of the same clothing creation to produce). In some embodiments, the total bill also calculates estimated tax and shipping fees. Next, the personalized garment and clothing design process 100 performs a step for transmitting the user order for creation of the clothing item(s)/garment(s) as designed by the user (at 180). In some embodiments, the personalized garment and clothing design process 100 only transmits the user order upon confirmation of payment of the total bill by the user. In some embodiments, the user's order is transmitted to a production unit to create the user's clothing item(s)/garment(s). After the clothing item(s)/garment(s) are created and assembled, the personalized garment and clothing design process 100 of some embodiments performs a final step of shipping the clothing item(s)/garment(s) to the user (at 190). Then the personalized garment and clothing design process 100 ends.

Figure 13:
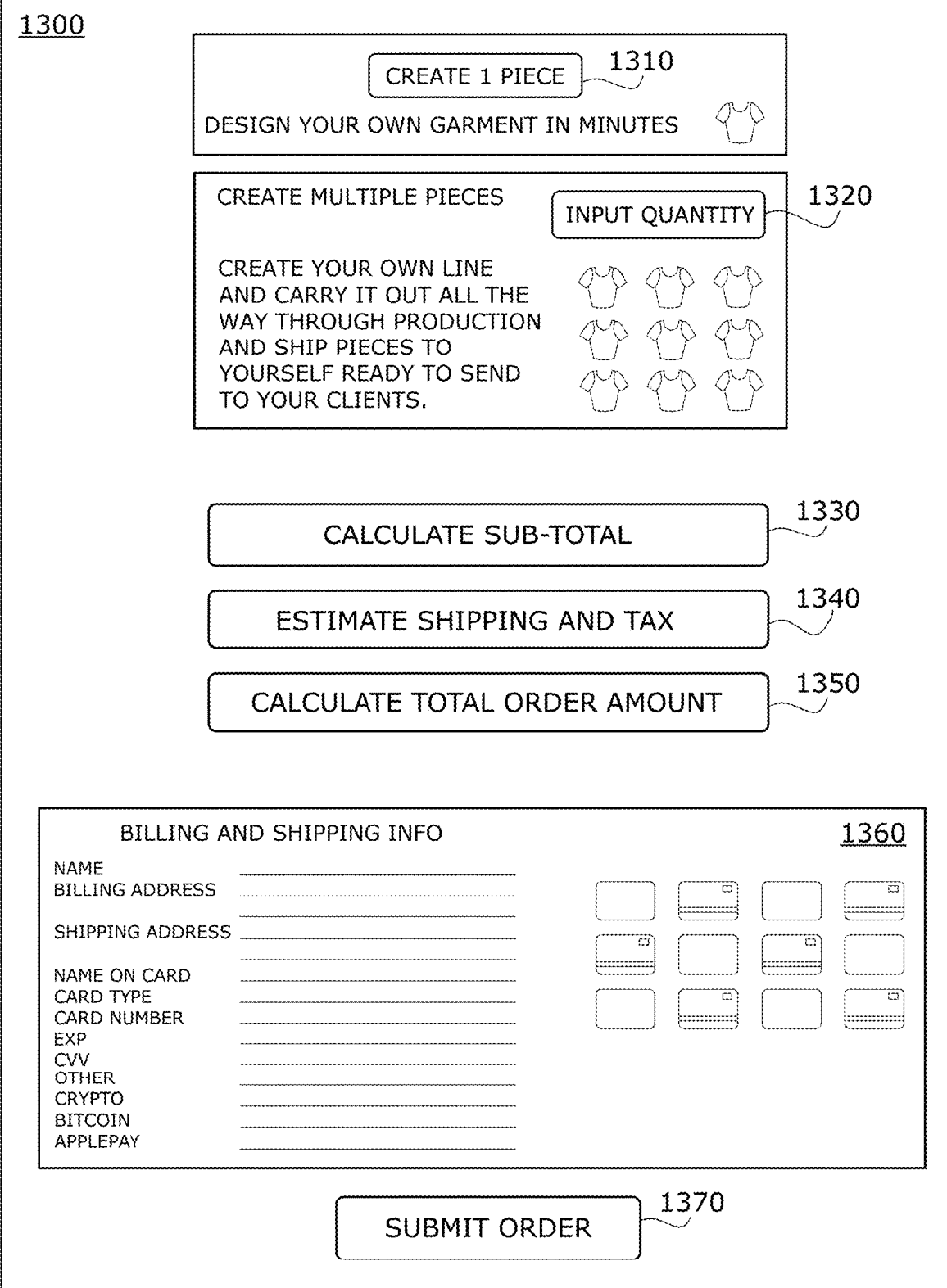
FIG. 13 conceptually illustrates a clothing and garment creation item ordering UI of the interactive web site of the personalized garment and clothing design service hosted by the personalized garment and clothing design system in some embodiments.

By way of example, FIG. 13 conceptually illustrates a clothing and garment creation item ordering UI 1300 of the interactive website of the personalized garment and clothing design service hosted by the personalized garment and clothing design system. As shown in this figure, the clothing and garment creation item ordering UI 1300 has several user-selectable elements and tools to finalize the user's order. Specifically, the clothing and garment creation item ordering UI 1300 includes a single quantity selection tool 1310 that is configured to set a production quantity of 'one' for creation of user's clothing or garment item, a quantity input field 1320 that is configured to accept a whole number greater than 'one' as a quantity input value when the user's order is intended for multiples of the same clothing or garment item (such as when the user is creating a unique line of clothing or garments to sell on their own or through other outlets), a sub-total calculation tool 1330 that calculates a total amount for all items in the bill of materials and adds a production fee and profit margin to the total, a shipping and tax estimation tool 1340 that estimates a shipping cost and calculates tax based on at least a state of residence, and a final total order amount calculation tool 1350 that adds the total amount calculated by the sub-total calculation tool 1330 and the shipping cost estimation and tax due from the shipping and tax estimation tool 1340, and any other extraneous cost additions (e.g., expedited shipping, international surcharges, etc.) to get a final sum total order amount due. The clothing and garment creation item ordering UI 1300 also includes a billing and shipping information input area 1360 and a submit order tool 1360. When the user provides the billing and shipping information into the clothing and garment creation item ordering UI 1300 and clicks the submit order tool 1360, the personalized garment and clothing design system verifies that the billing and shipping information is valid, and upon validation, submits the order which is then transmitted to the production team as the user's order.

Figure 14:
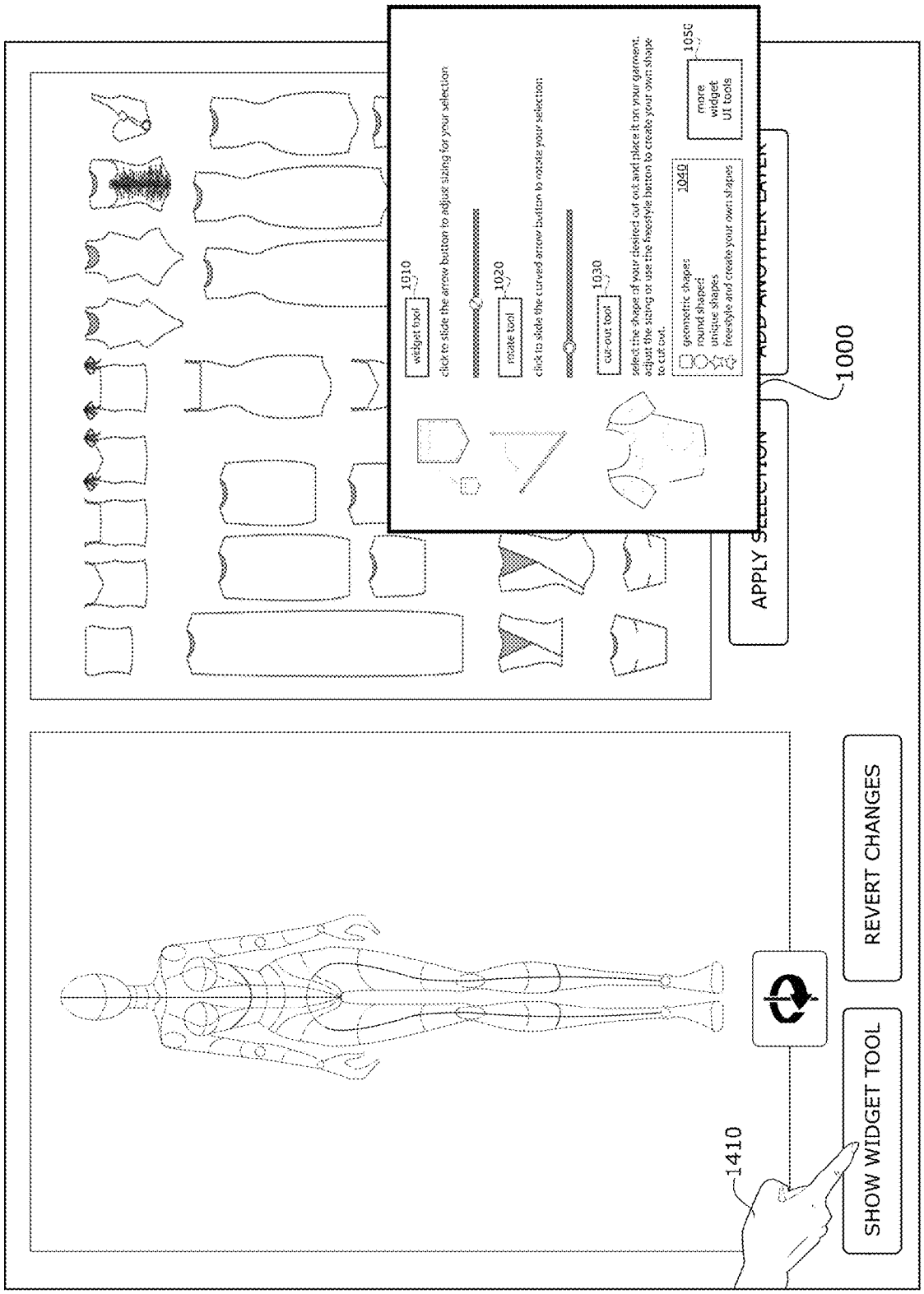
FIG. 14 conceptually illustrates a widget UI tools selection interface hovering over another interface and digital mannequin view in some embodiments.

By way of example, FIG. 14 conceptually illustrates a widget UI tools selection interface 1000 hovering over another interface and digital mannequin view in some embodiments. Specifically, when a user selects 1410 the widget UI tools button 470, the widget UI tools selection interface 1000 appears as configured, in this example, as hovering. From here, the user can select any of several UI tools for working on their selections. Examples of the many UI tools (without limitation) that are accessible to the user through the widget UI tools selection interface 1000, or via other menu options or configuration settings, are described next, by reference to FIGS. 15-25.

Figure 15:
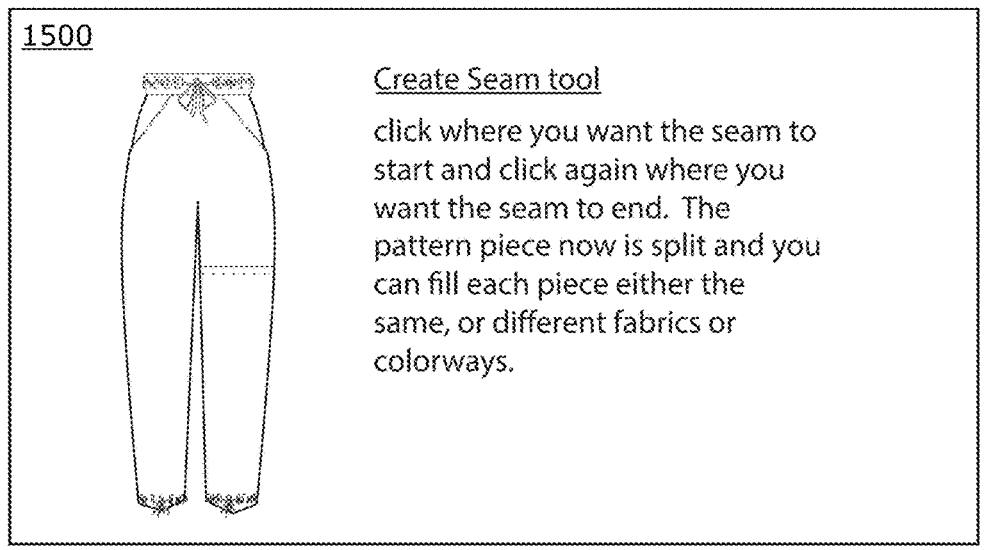
FIG. 15 conceptually illustrates a create seam tool in some embodiments.

By way of example, FIG. 15 conceptually illustrates a create seam tool 1500. As shown in this figure, the create seam tool 1500 is configured to create a seam by user interaction pointing along the fabric/pattern piece to indicate where the seam is to be created. After the user indicates the seam location, the create seam tool 1500 separates the fabric/pattern piece into two, thereby allowing the user to switch fabrics or colors at the seam, add fabrics into the seam, add or change stitching at the seam, etc.

Figure 16:
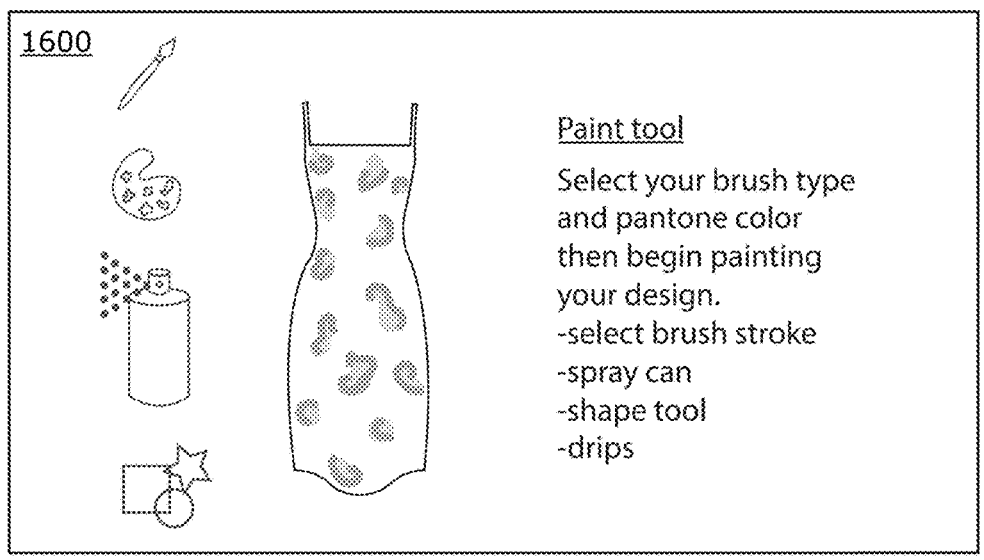
FIG. 16 conceptually illustrates a paint tool in some embodiments.

For another tool the user may select, FIG. 16 conceptually illustrates a paint tool 1600. As shown in this figure, the paint tool 1600 is configured to add color by paint-style application from the user. The paint tool 1600 allows the user to select a brush type from a brush library and a pantone color. Then the user can begin painting a design on the fabric/pattern piece. The user can further refine the selections by selecting a brush stroke type, a spray can for aerosol-like spraying of paint, a shape tool for stamp pressing and/or locked area of fabric/pattern piece in which to apply paint, a dripping tool, a widget tool for opacity and brush weight, an illustrator tool, etc.

Figure 17:
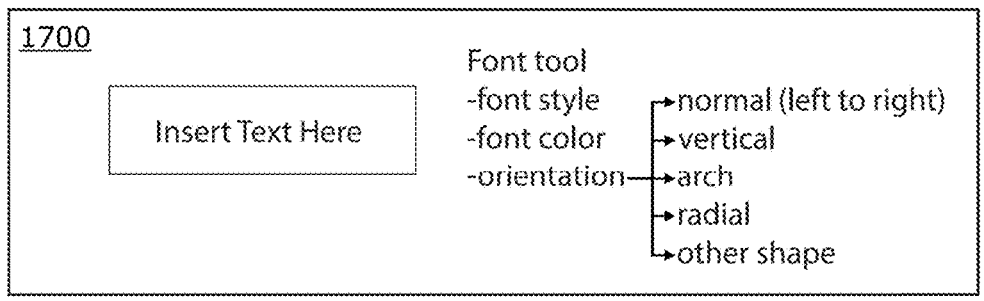
FIG. 17 conceptually illustrates a text and font tool in some embodiments.

By reference to another tool, FIG. 17 conceptually illustrates a text and font tool 1700. As shown in this figure, the text and font tool 1700 is configured to receive user input of text and provide options for font styling and orientation (e.g., font style, font color, font size, orientation of text, etc.). The orientation of text can be selected by the user, such as normal (straight left to right), vertical, arched, radial, even spacing of letters/characters along horizontal, vertical, or angle, discombobulated spacing of letters/characters along horizontal, vertical, or angle, etc. Colors are applied with an appearance style, such as metallic, clear, three-dimensional (3D) or bubbling (3D bubble appearance), matte, shiny, glossy, satin, by selection from appearance widget/library.

Figure 18:
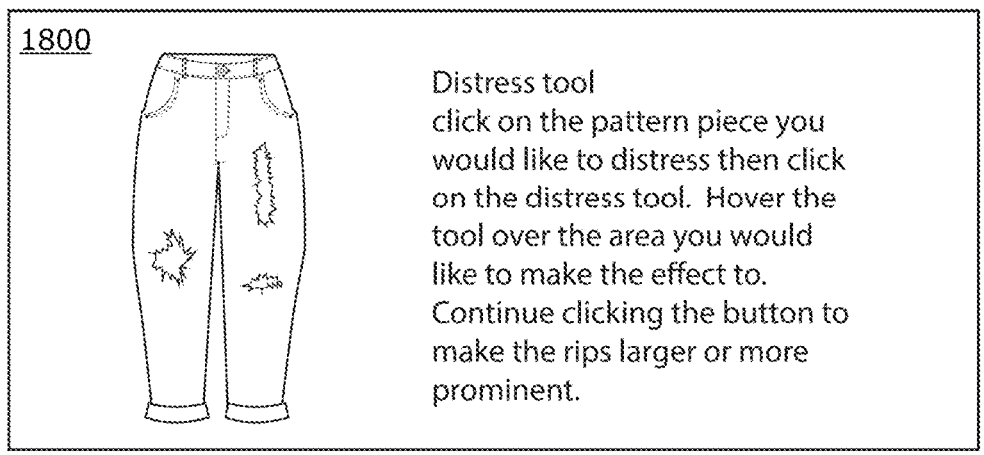
FIG. 18 conceptually illustrates a distress tool in some embodiments.

By way of example, FIG. 18 conceptually illustrates a distress tool 1800. As shown in this figure, the distress tool 1800 is configured to distress and/or rip fabric of a pattern piece and enable the user to adjust the severity of the distressing. The user of the distress tool 1800 simply selects the pattern piece to distress and, upon selecting the distress tool 1800, hovers over and click-selects the area of the fabric to distress or rip. The more the user click-selects the area, the greater the distressing of the fabric applied by the distress tool 1800 (or greater the rips—larger, longer, wider, more prominent, etc., effected by user hovering selections in combination with click-selecting on the fabric area(s)).

Figure 19:
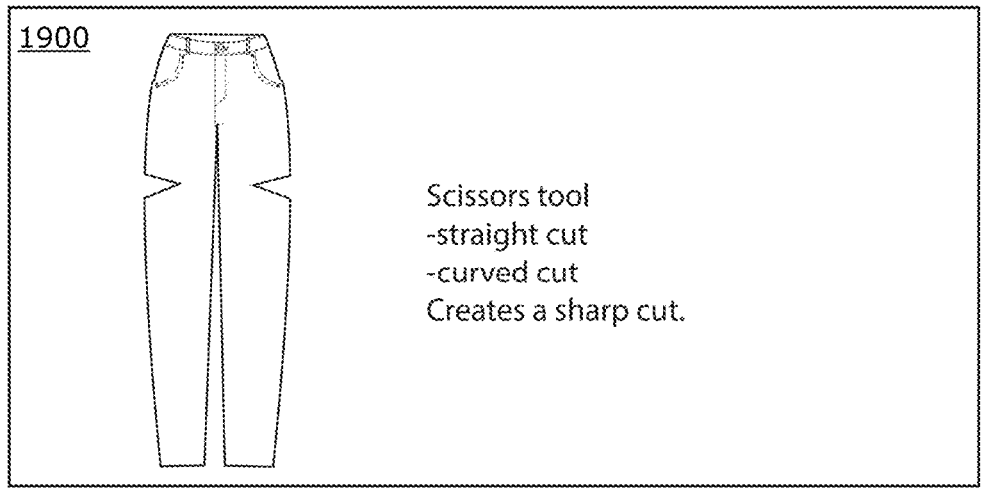
FIG. 19 conceptually illustrates a scissors tool in some embodiments.

Now referring to another tool, FIG. 19 conceptually illustrates a scissors tool 1900. As shown in this figure, the scissors tool 1900 enables the user to make cuts in the fabric of a selected pattern piece. The user would select the scissors tool 1900 and click to start the cut, move the scissors tool 1900 (by mouse movement, cursor movement, finder movement on a touchscreen, etc.), and click at the location to end the cut. Specifically, the scissors tool 1900 is configured to make straight cuts, curved cuts, sharp cuts, etc., as long or wide as the user interaction dictates.

Figure 20:
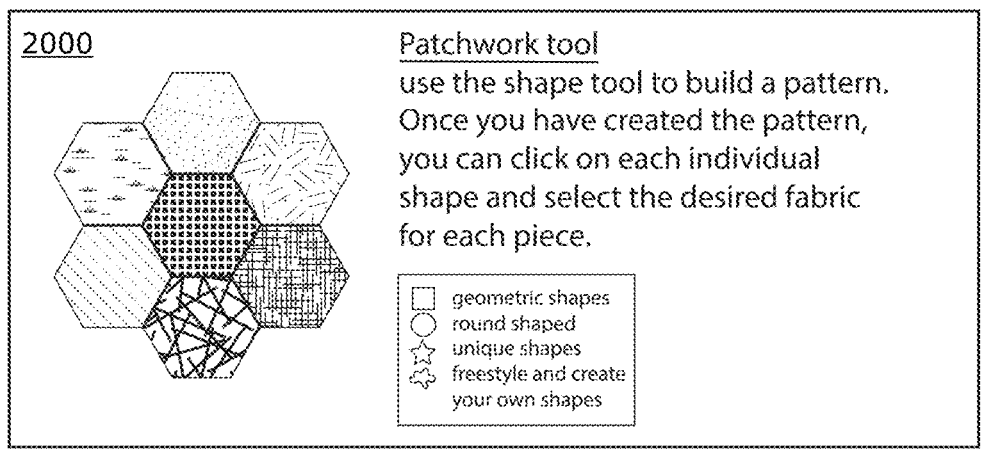
FIG. 20 conceptually illustrates a patchwork tool in some embodiments.

In another view, FIG. 20 conceptually illustrates a patchwork tool 2000. As shown in this figure, the patchwork tool 2000 is configured to create a fabric using patchwork design and quilting. Specifically, the user can create an original fabric using patchwork design and quilting by selections from an elastic library. The patchwork options in the elastic library vary from corded to thick, with any range of sizes, patterns, shapes, colors, etc.

By way of example, FIG. 21 conceptually illustrates a length tool 2100. As shown in this figure, the length tool 2100 is configured to adjust length of a user-selected pattern piece by selecting an edge of the pattern piece and sliding a lengthening arrow widget accordingly to increase or decrease length of the pattern piece.

Turning now to FIG. 22, a width tool 2200 is conceptually illustrated. As shown in this figure, the width tool 2200 is configured to adjust width of a user-selected pattern piece by selecting an edge of the pattern piece and sliding a widening arrow widget accordingly to increase or decrease width of the pattern piece.

By way of another tool example, FIG. 23 conceptually illustrates a create shape tool 2300. As shown in this figure, the create shape tool 2300 is configured to create a shape pattern piece by user selection of a shape from a plurality of shapes or by freestyle creation of a unique user-designed shape. After creation of a shape, the user may optionally add straps, closures, sleeves, or any other garment details to the shape pattern piece.

Figure 24:
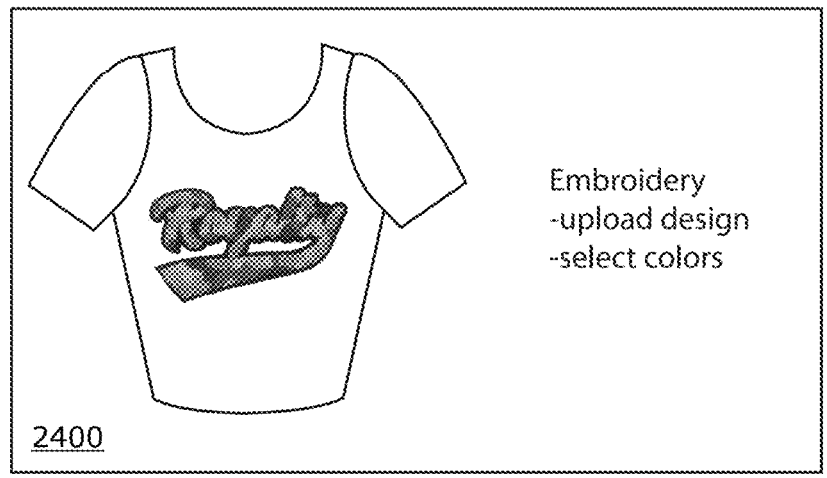
FIG. 24 conceptually illustrates an embroidery tool in some embodiments.

Referring to FIG. 24, an embroidery tool 2400 is conceptually illustrated. As shown in this figure, the embroidery tool 2400 is configured to add an embroidery to a pattern piece via user upload of a design and selection of colors and placement on the pattern piece.

Figure 25:
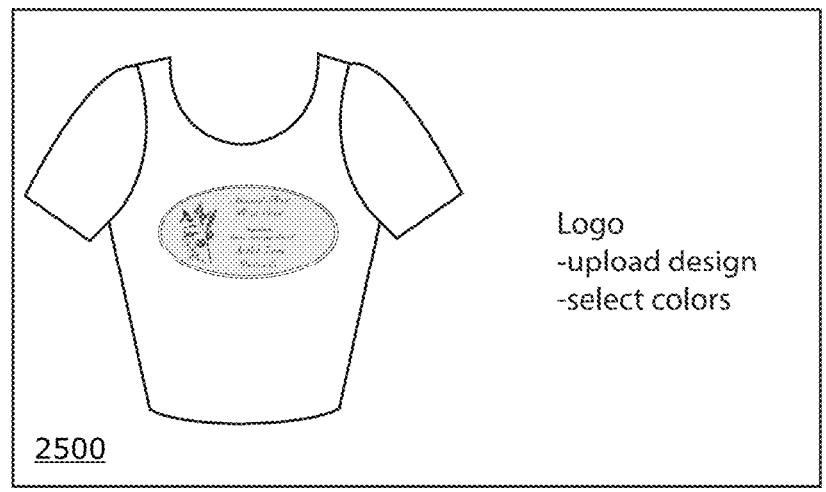
FIG. 25 conceptually illustrates a logo tool in some embodiments.

By reference to another example tool, FIG. 25 conceptually illustrates a logo tool 2500. As shown in this figure, the logo tool 2500 is configured to add a logo design to a pattern piece via user upload of the logo design and selection of color(s) for the logo and placement on the pattern piece.

While the tools described above by reference to FIGS. 15-25 are supported by embodiments described in this disclosure, the tools which the user may select are not limited to only these tools. For instance, other tools that are accessible to the user include an ombre tool to apply a sprinkle or shake-like detail to the pattern piece (with user selections of color, density, size, etc.), a zipper tool that is configured to add a zipper by each user selection from a zipper library, a belt tool that is configured to add a belt by each user selection of a belt from a belt library, a ruffle tool that is configured to add a straight or curved line ruffle along a path of user interaction on a pattern piece, a fringe tool that is configured to create horizontal slashes in a selected fabric or pattern piece with a widget to adjust length and width of a slash and connect pieces by an attach tool, a circumference tool that is configured to increase or decrease circumference by selection of a hem or hemline, a tie dye tool that is configured to add tie-dye pattern appearance to a piece by user selection of multiple colors to blend together, and other such tools. Furthermore, the supported tools leverage any of several libraries, such as those described above, as well as other libraries including, without limitation, a closures library, a beads library, a chain type library, a cuff options library, etc. Different fabrics of any sort are all supported and anticipated for use in this system, including those described above and other fabrics available for extensible addition and importing, such as imported fabrics accessible to the user via a fabrics from Peru library, a fabrics from Ghana library, a fabrics from Italy library, a swimwear fabrics library, a waterproof fabrics library (all available for selection in any of several different colors and appearances such as shiny or matte appearance), a bulletproof fabrics library (all available for selection in any of several different colors and appearances such as shiny or matte appearance), a neoprene fabrics library, a leather fabrics library, a faux leather fabrics library, a fur fabrics library, a faux fur fabrics library (all available for selection in any of several different colors and appearances such as shiny or matte appearance), gingham fabrics library, herringbone fabrics library, chevron fabrics library, plaid fabrics library, trims library, etc.

Figure 26:
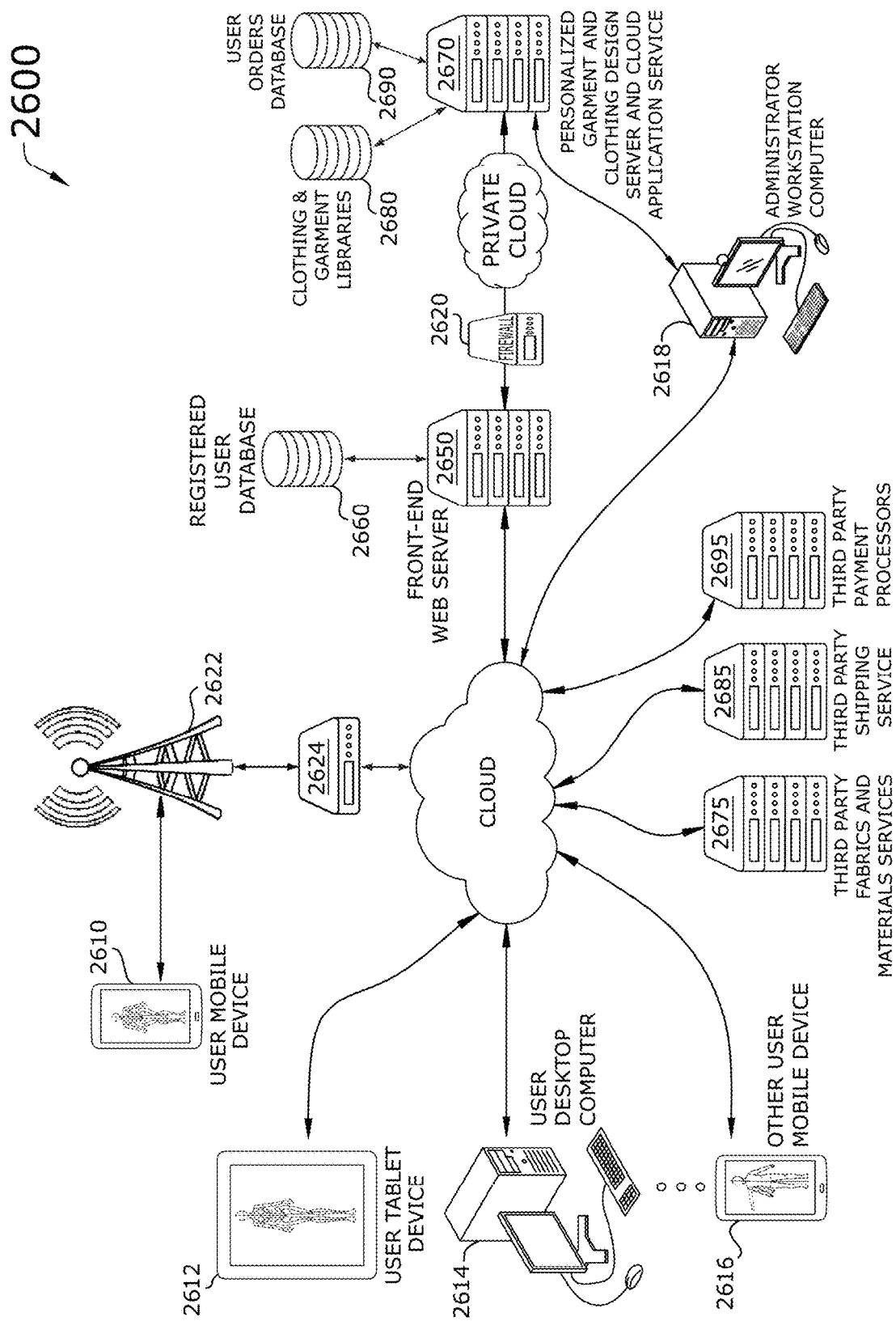
FIG. 26 conceptually illustrates a network architecture of a cloud-based personalized garment and clothing design system in some embodiments.

By way of example, FIG. 26 conceptually illustrates a network architecture of a software-as-a-service (SaaS) cloud-based personalized garment and clothing design system 2600 that hosts a personalized garment and clothing design cloud application service that is configured to provide a platform for users to connect to design and create personalized clothing and garments according to their needs, desires, requirements, and intentions. As shown in this figure, the personalized garment and clothing design system 2600 includes a set of user computing devices 2610-2616, an administrator workstation computer 2618, a firewall 2620, a wireless communication point 2622 (e.g., a cell tower for cellular data communication), a gateway 2624, a front-end web server 2650 that publishes a live interactive website (for traditional computing devices that connect via browser) and a mobile app portal gateway site (for mobile app connections via mobile devices), a registered user database 2660, a private and secure back-end personalized garment and clothing design server 2670 that hosts the cloud application service, a clothing & garment library content database 2680, and a user orders database 2690 for storing completed user orders and encrypted, validated payment and shipping information associated with each completed user order. In some embodiments, the personalized garment and clothing design system 2600 includes access to third party cloud services. In some embodiments, the personalized garment and clothing design system 2600 accesses one or more third party fabrics and materials procurement services 2675, one or more third party shipping services 2685, and one or more third party payment processors/services 2695.

In this specification, the terms "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer").

Figure 27:
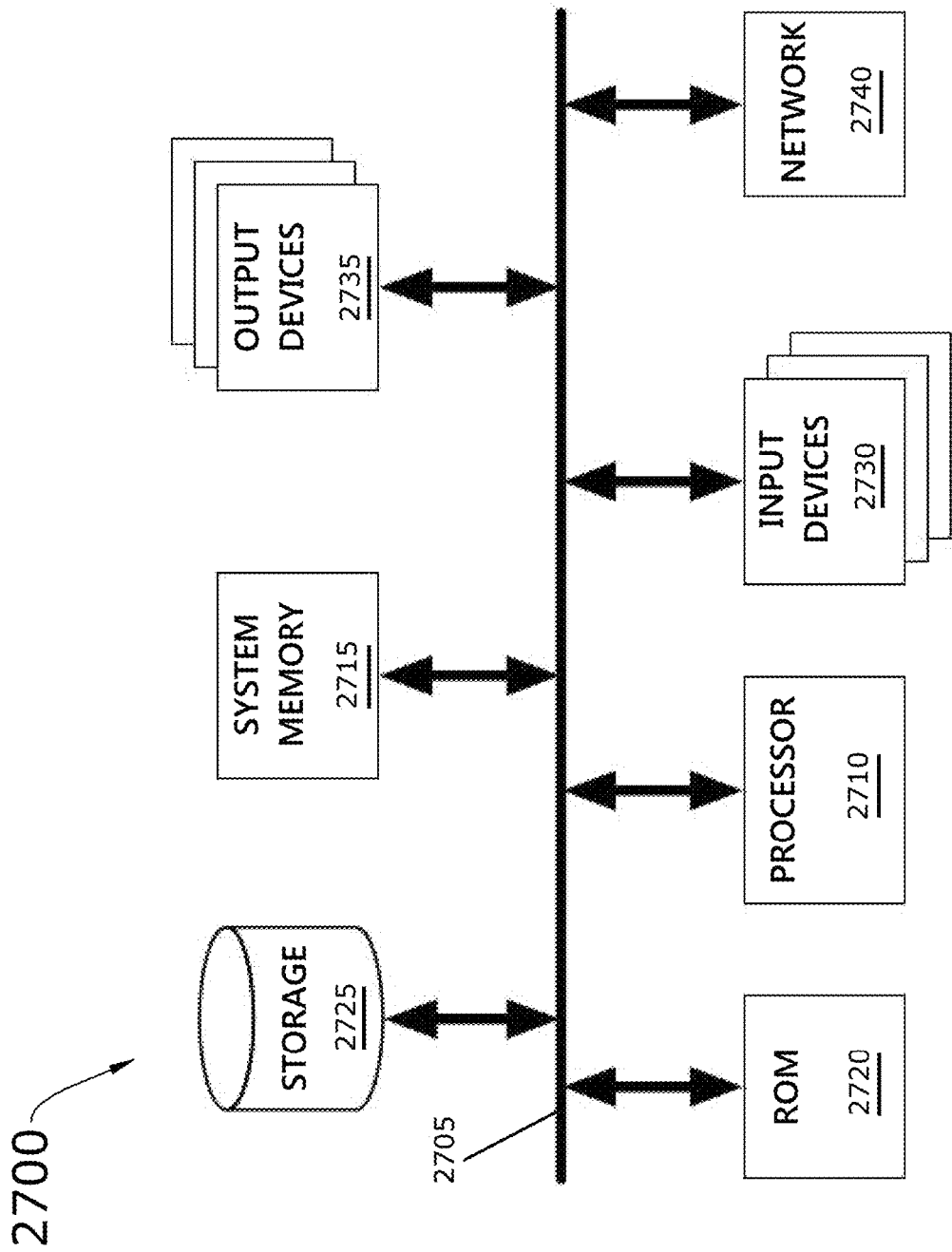
FIG. 27 conceptually illustrates an electronic system with which some embodiments of the invention are implemented.

FIG. 27 conceptually illustrates an electronic system 2700 with which some embodiments of the invention are implemented. The electronic system 2700 may be a computer, mobile device, tablet, smartphone, etc. Such an electronic system includes various types of computer readable media and interfaces for various other types of computer readable media. Electronic system 2700 includes a bus 2705, processing unit(s) 2710, a system memory 2715, a read-only memory 2720, a permanent storage device 2725, input devices 2730, output devices 2735, and a network 2740.

The bus 2705 collectively represents all system, peripheral, and chipset buses that communicatively connect the numerous internal devices of the electronic system 2700. For instance, the bus 2705 communicatively connects the processing unit(s) 2710 with the read-only memory 2720, the system memory 2715, and the permanent storage device 2725. From these various memory units, the processing unit(s) 2710 retrieves instructions to execute and data to process in order to execute the processes of the invention. The processing unit(s) may be a single processor or a multi-core processor in different embodiments. The read-only-memory (ROM) 2720 stores static data and instructions that are needed by the processing unit(s) 2710 and other modules of the electronic system. The permanent storage device 2725 is a read-and-write memory device that is a non-volatile memory unit which stores instructions and data even when the electronic system 2700 is off. Some embodiments of the invention use a mass-storage device as the permanent storage device 2725.

Other embodiments use a removable storage device as the permanent storage device 2725. Like the permanent storage device 2725, the system memory 2715 is a read-and-write memory device. However, unlike storage device 2725, the system memory 2715 is a volatile read-and-write memory, such as a random access memory. The system memory 2715 stores some of the instructions and data that the processor needs at runtime. In some embodiments, the invention's processes are stored in the system memory 2715, the permanent storage device 2725, and/or the read-only memory 2720. From these various memory units, the processing unit(s) 2710 retrieves instructions to execute and data to process in order to execute the processes of some embodiments.

The bus 2705 also connects to the input and output devices 2730 and 2735. The input devices enable the user to communicate information and commands to the electronic system. The input devices 2730 include keyboards and pointing devices. The output devices 2735 display images (including 3D imagery, such as the digital mannequin) generated by the electronic system 2700. The output devices 2735 include printers and display devices, such as liquid crystal displays (LCD) and organic light emitting diode (OLED) displays. Some embodiments include devices such as a touchscreen that functions as both input and output devices.

Finally, as shown in FIG. 27, bus 2705 also couples electronic system 2700 to a network 2740 through a network adapter (not shown). In this manner, the computer can be a part of a network of computers (such as a local area network ("LAN"), a wide area network ("WAN"), or an intranet), or a network of networks (such as the Internet, sometimes referred to as the "cloud" in connection with application services). Any or all components of electronic system 2700 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. Such computing and storage devices can be interconnected through communication networks.

Some embodiments include electronic components, such as microprocessors, storage and memory that store computer program instructions in a machine-readable or computer-readable medium (also referred to as non-transitory computer-readable medium or storage media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, many of the drawings conceptually illustrate user interfaces (UI) which demonstrate an interface for interacting with runtime processes or service methods in connection with the cloud application service hosted by the cloud-based personalized garment and clothing design system. In each case, the specific interface and UI tools, fields, areas, etc., may not be implemented in the same exact layout or manner as shown and described. However, the operations tied to the underlying functionality of the personalized garment and clothing design system and the personalized garment and clothing design process are carried out regardless of layout preferences and UI designs that may be deployed in different embodiments. Furthermore, the personalized garment and clothing design process could be carried out in a different sequence of steps or implemented using several sub-processes, or as part of a larger macro process. Thus, one of ordinary skill in the art would understand that the invention is not to be limited by the foregoing illustrative details, but rather is to be defined by the appended claims.

I claim:

1. A personalized garment and clothing design process comprising:

receiving, from a computing device operated by a particular user and connected over a network to a cloud server hosting a personalized garment and clothing design service which provides access to a plurality of personalized garment and clothing design user interfaces (UI) and UI tools, a selection of a prototypical digital mannequin and a set of body measurements associated with the particular user to customize a digital mannequin for interactive use by the particular user;

providing, by the personalized garment and clothing design service, a plurality of clothing and garment libraries to the computing device operated by the particular user, wherein the plurality of clothing and garment libraries are configured for visual output at the computing device and interactive access through a plurality of library UIs by the particular user, wherein the plurality of clothing and garment libraries comprises a tops library, a necklines library, a sleeves library, a bottoms library, and an apparel construction and accessories library, wherein the plurality of library UIs comprise a tops selection UI for access to the tops library, a necklines selection UI for access to the necklines library, a sleeves selection UI for access to the sleeves library, a bottoms selection UI for access to the bottoms library, and an apparel construction & accessories selection UI for access to the apparel construction and accessories library;

providing, by the personalized garment and clothing design service, a plurality of clothing and garment customization libraries and tools to the computing device operated by the particular user, wherein the plurality of clothing and garment customization libraries and tools are configured for visual output at the computing device and interactive access through a plurality of tools and customization UIs by the particular user, wherein the plurality of clothing and garment customization libraries and tools comprises a set of clothing and garment customization widget tools accessible through a widget UI tools selection interface, a stitching and hemline library accessible through a stitching and hemline selection UI, and a knits and fabrics library with custom knit and fabric tools accessible through a knits and fabrics selection UI, wherein the custom knit and fabric tools comprise (i) a fabric creation and upload tool that is configured to create a custom fabric when the particular user uploads a custom print and (ii) a fabric help guide tool that is configured to assist the particular user in identifying one or more fabrics that are suitable matches for one or more types of garments, wherein the set of clothing and garment customization widget tools comprise a size tool that is configured to scale size of a selected clothing and garment item without scaling size of any other unselected clothing and garment item that appears on the customized digital mannequin, an item rotate tool that is configured to rotate the selected clothing and garment item without rotating any other unselected clothing and garment item that appears on the customized digital mannequin, a cut-out tool that is configured to allow the particular user to make freehand cut outs in fabrics and garments on the customized digital mannequin, and shape selection tool that is configured to allow the particular user to make shape cut outs in fabrics and garments based on shape selections from a plurality of shapes;

receiving selections, made by the particular user interacting with a plurality of clothing and garment libraries, of clothing and garment items;

placing the selected clothing and garment items onto the customized digital mannequin for interaction and viewing by the particular user;

receiving selections, made by the particular user interacting with the apparel construction and accessories library by way of the apparel construction & accessories selection UI, of apparel construction and accessory items;

receiving a fabric selection, made by the particular user interacting with the knits and fabrics library with custom knit and fabric tools by way of the knits and fabrics selection UI, of at least one of (i) a fabric from the fabrics library and (ii) a particular custom fabric that is created by a selection by the particular user of the fabric creation and upload tool and a corresponding upload by the particular user of a particular custom print representing the particular custom fabric to create, wherein the received fabric selection is applied to each selected clothing and garment item appearing on the customized digital mannequin;

receiving a quantity value, as input by the particular user interacting with a unit quantity input field, for creation of a particular production item that incorporates all of the clothing and garment item selections, apparel construction and accessory item selections, and material selections;

automatically calculating, by a garment calculation algorithm running as a program within the personalized garment and clothing design service, a total bill for a particular production item order associated with creation of the particular production item, said calculation based on a bill of materials for the particular production item multiplied by the quantity value with additional calculation to add cost of production, a profit margin, taxes, and shipping costs; and transmitting, upon payment by the particular user of the total bill, the particular production item order to a production unit to create the particular production item in multiples specified by the quantity value, wherein the particular production item order is shipped to the particular user after production and assembly is completed.

2. The personalized garment and clothing design process of claim 1, wherein the clothing and garment items selected by the particular user comprise at least one of a bodice silhouette top from the tops library, a neckline from the necklines library, a pair of sleeves from the sleeves library, a set of bottoms from the bottoms library, and an accessory from the apparel construction and accessories library.

3. The personalized garment and clothing design process of claim 1, wherein the apparel construction and accessory items selected through the apparel construction & accessories selection UI by the particular user from the apparel construction and accessories library comprise at least one of a pocket, a zipper, a bow, a buckle, a patch, and a tassel.

4. The personalized garment and clothing design process of claim 3, wherein at least one of the apparel construction and accessory items selected through the apparel construction & accessories selection UI by the particular user from the apparel construction and accessories library is automatically placed onto the customized digital mannequin at a layer associated with a particular clothing and garment item previously placed onto the customized digital mannequin.

5. The personalized garment and clothing design process of claim 1 further comprising receiving a selection of a color for the fabric selection.

6. The personalized garment and clothing design process of claim 5 further comprising receiving a selection, made by the particular user interacting with the stitching and hemline library by way of the stitching and hemline selection UI, of at least one of a stitch and a hemline for the fabric selection.

* * * * *